(12) United States Patent
Larson et al.

(10) Patent No.: US 9,643,111 B2
(45) Date of Patent: May 9, 2017

(54) VECTOR MAXIMIZING SCREEN

(71) Applicant: National Oilwell Varco, L.P., Houston, TX (US)

(72) Inventors: Thomas Robert Larson, Montgomery, TX (US); Paul William Dufilho, Willis, TX (US)

(73) Assignee: National Oilwell Varco, L.P., Houston, TX (US)

( * ) Notice: Subject to any disclaimer, the term of this patent is extended or adjusted under 35 U.S.C. 154(b) by 323 days.

(21) Appl. No.: 14/200,515

(22) Filed: Mar. 7, 2014

(65) Prior Publication Data

US 2014/0251894 A1    Sep. 11, 2014

Related U.S. Application Data

(60) Provisional application No. 61/775,177, filed on Mar. 8, 2013.

(51) Int. Cl.
| | | |
|---|---|---|
| *B01D 33/03* | (2006.01) | |
| *B07B 1/46* | (2006.01) | |
| *B07B 13/16* | (2006.01) | |
| *E21B 21/06* | (2006.01) | |

(52) U.S. Cl.
CPC ........ *B01D 33/0361* (2013.01); *B07B 1/4609* (2013.01); *B07B 1/4654* (2013.01); *B07B 13/16* (2013.01); *E21B 21/06* (2013.01); *E21B 21/065* (2013.01)

(58) Field of Classification Search
None
See application file for complete search history.

(56) References Cited

U.S. PATENT DOCUMENTS

| | | | |
|---|---|---|---|
| 399,616 A | 3/1889 | Riddle | 209/238 |
| 485,488 A | 11/1892 | Cockrell | 209/401 |
| 599,468 A | 2/1898 | Cross | |

(Continued)

FOREIGN PATENT DOCUMENTS

| | | |
|---|---|---|
| DE | 4127929 A1 | 2/1993 |
| FR | 2 611 559 | 9/1988 |

(Continued)

OTHER PUBLICATIONS

PCT International Search Report and Written Opinion dated May 27, 2014 for International Application No. PCT/US2014/022172, 12 pages.

(Continued)

*Primary Examiner* — Benjamin Kurtz
(74) *Attorney, Agent, or Firm* — Amerson Law Firm, PLLC

(57) ABSTRACT

A screen panel assembly includes a screen panel and one or more raised screen components, wherein at least one of the raised screen components is disposed on the screen panel. Furthermore, each of the one or more raised screen components includes at least one inclined screen surface that defines a first plane that is oriented at a first angle relative to said screen panel. Additionally, the first plane is substantially aligned with a second plane that is oriented at a second angle relative to a third plane that is perpendicular to a displacement vector along which the screen panel assembly is accelerated by a vibratory separation device.

23 Claims, 18 Drawing Sheets

(56) References Cited

U.S. PATENT DOCUMENTS

| | | | |
|---|---|---|---|
| 865,185 A | 9/1907 | Kerrigan | |
| 1,078,380 A | 11/1913 | Reynolds | |
| 1,139,469 A | 5/1915 | Potter | 209/401 |
| 1,304,918 A | 5/1919 | Sweetland | |
| 1,344,747 A | 1/1920 | Wright | |
| 1,459,845 A | 6/1923 | Mitchell | |
| 1,462,804 A | 7/1923 | Evans | |
| 1,561,632 A * | 11/1925 | Woodward | B07B 1/4654 209/320 |
| 1,822,298 A | 9/1931 | Kerrigan | |
| 1,830,792 A | 11/1931 | Herrmann | 209/401 |
| 1,885,154 A | 11/1932 | Strezynski et al. | |
| 1,886,174 A | 11/1932 | Hazeltine | 209/269 |
| 1,950,861 A | 3/1934 | O'Toole, Sr. | |
| 1,997,713 A | 4/1935 | Boehm | 298/401 |
| 2,082,513 A | 6/1937 | Roberts | 210/76 |
| 2,089,548 A | 8/1937 | Frantz et al. | 210/389 |
| 2,112,784 A | 3/1938 | McNitt | 99/105 |
| 2,341,169 A | 2/1944 | Wilson et al. | 73/51 |
| 2,418,529 A | 4/1947 | Stern | 51/309 |
| 2,578,456 A | 12/1951 | Smith | 233/7 |
| 2,653,521 A | 9/1953 | Einarsson | 209/70 |
| 2,711,854 A | 6/1955 | Kjellgren | 494/53 |
| 2,716,493 A | 8/1955 | Hutchison | 209/269 X |
| 2,750,043 A | 6/1956 | Thompson | 210/149 |
| 2,895,669 A | 7/1959 | Bobo | 494/10 |
| 2,919,898 A | 1/1960 | Marwil et al. | 255/1.8 |
| 2,926,785 A | 3/1960 | Sander | 209/401 |
| 2,928,546 A | 3/1960 | Church | 210/319 |
| 2,938,393 A | 5/1960 | Dunn et al. | 74/61 |
| 2,942,731 A | 6/1960 | Soldini | 209/293 |
| 2,955,753 A | 10/1960 | O'Conor et al. | 494/5 |
| 2,961,154 A | 11/1960 | Bergey | 494/1 |
| 2,973,865 A | 5/1961 | Cibula | 209/315 |
| 3,012,674 A | 12/1961 | Hoppe | 209/401 |
| 3,053,379 A | 9/1962 | Roder et al. | 198/220 |
| 3,064,806 A | 11/1962 | Tapani | 209/17 |
| 3,070,291 A | 12/1962 | Bergey | 494/1 |
| 3,219,107 A | 11/1965 | Brown et al. | 166/8 |
| 3,226,989 A | 1/1966 | Robins | 74/87 |
| 3,268,159 A | 8/1966 | Kern | 233/7 |
| 3,302,720 A | 2/1967 | Brandon | 166/42 |
| 3,415,181 A | 12/1968 | Hart | |
| 3,498,393 A | 3/1970 | West et al. | 175/48 |
| 3,605,919 A | 9/1971 | Bromell et al. | 175/27 |
| 3,629,859 A | 12/1971 | Copland et al. | 340/172.5 |
| 3,640,344 A | 2/1972 | Brandon | 166/307 |
| 3,659,465 A | 5/1972 | Oshima et al. | 74/61 |
| 3,716,138 A | 2/1973 | Lumsden | 209/401 |
| 3,726,136 A | 4/1973 | McKean et al. | 73/155 |
| 3,795,361 A | 3/1974 | Lee | 233/7 |
| 3,796,299 A | 3/1974 | Musschoot | 198/220 |
| 3,855,380 A | 12/1974 | Gordon et al. | 264/97 |
| 3,874,733 A | 4/1975 | Poundstone et al. | 299/17 |
| 3,885,734 A | 5/1975 | Lee | 233/3 |
| 3,900,393 A | 8/1975 | Wilson | 209/399 |
| 3,934,792 A | 1/1976 | High et al. | 233/7 |
| 3,955,411 A | 5/1976 | Lawson, Jr. | 73/155 |
| 3,968,033 A | 7/1976 | Illemann et al. | 209/403 |
| 3,993,146 A | 11/1976 | Poundstone et al. | 175/206 |
| 4,000,074 A | 12/1976 | Evans | 210/369 |
| 4,019,987 A | 4/1977 | Krasnow | |
| 4,022,596 A | 5/1977 | Pedersen | |
| 4,033,865 A | 7/1977 | Derrick, Jr. | 209/275 |
| 4,038,152 A | 7/1977 | Atkins | 201/2.5 |
| 4,082,657 A | 4/1978 | Gage | 209/311 |
| 4,085,888 A | 4/1978 | Jager | 233/7 |
| 4,115,507 A | 9/1978 | Pico et al. | 264/267 |
| 4,116,288 A | 9/1978 | Love | 175/66 |
| 4,192,743 A | 3/1980 | Bastgen et al. | 210/712 |
| 4,208,906 A | 6/1980 | Roberts, Jr. | 73/155 |
| 4,212,731 A | 7/1980 | Wallin et al. | 209/366.5 |
| 4,222,988 A | 9/1980 | Barthel | 422/309 |
| 4,224,821 A | 9/1980 | Taylor et al. | 73/32 R |
| 4,228,949 A | 10/1980 | Jackson | 233/7 |
| 4,233,181 A | 11/1980 | Goller et al. | 252/425.3 |
| 4,240,578 A | 12/1980 | Jackson | 233/7 |
| 4,297,225 A | 10/1981 | Hartley | 210/779 |
| 4,298,160 A | 11/1981 | Jackson | 233/7 |
| 4,298,162 A | 11/1981 | Hohne | 233/7 |
| 4,298,572 A | 11/1981 | Moffet et al. | 422/68 |
| 4,306,974 A | 12/1981 | Harry | 210/388 |
| 4,319,482 A | 3/1982 | Bunner | 73/153 |
| 4,319,991 A | 3/1982 | Crone, Jr. et al. | 209/255 |
| 4,322,288 A | 3/1982 | Schmidt | 209/356 |
| 4,339,072 A | 7/1982 | Hiller | 233/7 |
| 4,350,591 A | 9/1982 | Lee | 210/384 |
| 4,369,915 A | 1/1983 | Oberg et al. | 494/8 |
| 4,378,906 A | 4/1983 | Epper et al. | 494/54 |
| 4,380,494 A | 4/1983 | Wilson | 290/319 |
| 4,411,074 A | 10/1983 | Daly | 34/32 |
| 4,432,064 A | 2/1984 | Barker et al. | 364/550 |
| 4,446,022 A | 5/1984 | Harry | 210/388 |
| 4,459,207 A | 7/1984 | Young | 209/269 |
| 4,482,459 A | 11/1984 | Shiver | 210/639 |
| 4,491,517 A | 1/1985 | Janovac | 209/401 |
| 4,495,065 A | 1/1985 | DeReamer et al. | 209/243 |
| 4,526,687 A | 7/1985 | Nugent | 210/202 |
| 4,536,286 A | 8/1985 | Nugent | 210/202 |
| 4,546,783 A | 10/1985 | Lott | 134/109 |
| 4,549,431 A | 10/1985 | Soeiinah | 73/152.49 |
| 4,553,429 A | 11/1985 | Evans et al. | 73/152.21 |
| 4,573,115 A | 2/1986 | Halgrimson | 364/138 |
| 4,575,336 A | 3/1986 | Mudd et al. | 432/72 |
| 4,575,421 A | 3/1986 | Derrick et al. | 298/397 |
| 4,606,415 A | 8/1986 | Gray, Jr. et al. | 175/24 |
| 4,624,417 A | 11/1986 | Gangi | 241/17 |
| 4,634,535 A | 1/1987 | Lott | 210/780 |
| 4,635,735 A | 1/1987 | Crownover | 175/48 |
| 4,639,258 A | 1/1987 | Schellstede et al. | 95/260 |
| 4,650,687 A | 3/1987 | Willard et al. | 426/438 |
| 4,668,213 A | 5/1987 | Kramer | 494/8 |
| 4,685,329 A | 8/1987 | Burgess | 73/151 |
| 4,691,744 A | 9/1987 | Haver et al. | 139/425 R |
| 4,696,353 A | 9/1987 | Elmquist et al. | 175/206 |
| 4,696,751 A | 9/1987 | Eifling | 210/780 |
| 4,729,548 A | 3/1988 | Sullins | 266/44 |
| 4,743,226 A | 5/1988 | Day et al. | 494/53 |
| 4,751,887 A | 6/1988 | Terry et al. | 110/246 |
| 4,770,711 A | 9/1988 | Deal, III et al. | 134/18 |
| 4,783,057 A | 11/1988 | Sullins | 266/44 |
| 4,791,002 A | 12/1988 | Baker et al. | 426/641 |
| 4,793,421 A | 12/1988 | Jasinski | 175/27 |
| 4,795,552 A | 1/1989 | Yun et al. | 209/319 |
| 4,799,987 A | 1/1989 | Sullins | 156/425 |
| 4,805,659 A | 2/1989 | Gunnewig et al. | 137/118 |
| 4,807,469 A | 2/1989 | Hall | 73/155 |
| 4,809,791 A | 3/1989 | Hayatdavoudi | 175/40 |
| 4,832,853 A | 5/1989 | Shiraki et al. | 210/781 |
| 4,844,106 A | 7/1989 | Hunter et al. | 134/73 |
| 4,846,352 A | 7/1989 | Bailey | 209/399 |
| 4,857,176 A | 8/1989 | Derrick et al. | 209/392 |
| 4,882,054 A | 11/1989 | Derrick et al. | 210/389 |
| 4,889,733 A | 12/1989 | Willard et al. | 426/438 |
| 4,889,737 A | 12/1989 | Willard et al. | 426/550 |
| 4,892,767 A | 1/1990 | Freissle | |
| 4,895,665 A | 1/1990 | Colelli et al. | 210/710 |
| 4,895,731 A | 1/1990 | Baker et al. | 426/641 |
| 4,896,835 A | 1/1990 | Fahrenholz | 241/74 |
| 4,911,834 A | 3/1990 | Murphy | 210/167 |
| 4,915,452 A | 4/1990 | Dibble | 299/17 |
| 4,940,535 A | 7/1990 | Fisher et al. | 209/250 |
| 4,942,929 A | 7/1990 | Malachosky et al. | 175/66 |
| 4,961,722 A | 10/1990 | Taylor et al. | 494/36 |
| 5,010,966 A | 4/1991 | Stokley et al. | 175/66 |
| 5,053,082 A | 10/1991 | Flanigan et al. | 134/25.1 |
| 5,066,350 A | 11/1991 | Sullins | 156/187 |
| 5,080,721 A | 1/1992 | Flanigan et al. | 134/26 |
| 5,107,874 A | 4/1992 | Flanigan et al. | 134/60 |
| 5,109,933 A | 5/1992 | Jackson | 175/66 |
| 5,129,469 A | 7/1992 | Jackson | 175/66 |
| 5,131,271 A | 7/1992 | Haynes et al. | 73/290 |
| 5,145,256 A | 9/1992 | Wiemers et al. | 366/336 |
| 5,147,277 A | 9/1992 | Shapiro | 494/53 |

(56) References Cited

U.S. PATENT DOCUMENTS

| | | | | |
|---|---|---|---|---|
| 5,156,749 A | 10/1992 | Williams | | 210/770 |
| 5,156,751 A | 10/1992 | Miller | | 210/787 |
| 5,181,578 A | 1/1993 | Lawler | | 175/424 |
| 5,190,645 A | 3/1993 | Burgess | | 210/144 |
| 5,200,372 A | 4/1993 | Kuroyama et al. | | 501/96 |
| 5,203,762 A | 4/1993 | Cooperstein | | 494/7 |
| 5,211,291 A | 5/1993 | Kelley et al. | | |
| 5,221,008 A | 6/1993 | Derrick, Jr. et al. | | 209/269 |
| 5,226,546 A | 7/1993 | Janssens et al. | | 209/319 |
| 5,227,057 A | 7/1993 | Lundquist | | 210/174 |
| 5,229,018 A | 7/1993 | Forrest | | 252/8.551 |
| 5,232,099 A | 8/1993 | Maynard | | 209/311 |
| 5,253,718 A | 10/1993 | Lawler | | 175/20 |
| 5,256,291 A | 10/1993 | Cagle | | 210/499 |
| 5,265,730 A | 11/1993 | Norris et al. | | 209/326 |
| 5,273,112 A | 12/1993 | Schultz | | 166/374 |
| 5,278,549 A | 1/1994 | Crawford | | 340/853.2 |
| 5,314,058 A | 5/1994 | Graham | | 198/753 |
| 5,319,972 A | 6/1994 | Oblak et al. | | 73/290 |
| 5,329,465 A | 7/1994 | Arcella et al. | | 364/551.01 |
| 5,330,057 A | 7/1994 | Schiller et al. | | 209/392 |
| 5,332,101 A | 7/1994 | Bakula | | 209/403 |
| 5,337,966 A | 8/1994 | Francis et al. | | 241/46.06 |
| 5,370,797 A | 12/1994 | Cagle | | 210/499 |
| 5,378,364 A | 1/1995 | Welling | | 210/512.1 |
| 5,385,669 A | 1/1995 | Leone, Sr. | | 210/488 |
| 5,392,925 A | 2/1995 | Seyffert | | 209/405 |
| 5,400,376 A | 3/1995 | Trudeau | | 377/21 |
| 5,403,260 A | 4/1995 | Hensley | | 494/53 |
| 5,417,793 A | 5/1995 | Bakula | | 156/308.2 |
| 5,417,858 A | 5/1995 | Derrick et al. | | 210/388 |
| 5,417,859 A | 5/1995 | Bakula | | 210/388 |
| 5,454,957 A | 10/1995 | Roff | | 210/768 |
| 5,465,798 A | 11/1995 | Edlund et al. | | 175/24 |
| 5,474,142 A | 12/1995 | Bowden | | 175/27 |
| 5,488,104 A | 1/1996 | Schulz | | 536/86 |
| 5,489,204 A | 2/1996 | Conwell et al. | | 432/153 |
| 5,494,584 A | 2/1996 | McLachlan et al. | | 210/739 |
| 5,516,348 A | 5/1996 | Conwell et al. | | 51/309 |
| 5,534,207 A | 7/1996 | Burrus | | 264/150 |
| 5,547,479 A | 8/1996 | Conwell et al. | | 51/309 |
| 5,566,889 A | 10/1996 | Preiss | | 241/19 |
| 5,567,150 A | 10/1996 | Conwell et al. | | 432/14 |
| 5,570,749 A | 11/1996 | Reed | | 175/66 |
| 5,593,582 A | 1/1997 | Roff, Jr. | | 210/325 |
| 5,597,042 A | 1/1997 | Tubel et al. | | 166/250.01 |
| 5,626,234 A | 5/1997 | Cook et al. | | 209/315 |
| 5,632,714 A | 5/1997 | Leung et al. | | 494/53 |
| 5,636,749 A | 6/1997 | Wojciechowski | | 209/403 |
| 5,638,960 A | 6/1997 | Beuermann et al. | | 209/397 |
| 5,641,070 A | 6/1997 | Seyffert | | 209/314 |
| 5,643,169 A | 7/1997 | Leung et al. | | 494/53 |
| 5,653,674 A | 8/1997 | Leung | | 494/53 |
| 5,662,165 A | 9/1997 | Tubel et al. | | 166/250.01 |
| 5,669,941 A | 9/1997 | Peterson | | 51/295 |
| 5,681,256 A | 10/1997 | Nagafuji | | 494/9 |
| D386,874 S | 11/1997 | Glaun | | D34/29 |
| D387,534 S | 12/1997 | Glaun | | D34/29 |
| D388,583 S | 12/1997 | Glaun | | D34/29 |
| 5,695,442 A | 12/1997 | Leung et al. | | 494/37 |
| 5,699,918 A | 12/1997 | Dunn | | 209/397 |
| D388,924 S | 1/1998 | Glaun | | D34/29 |
| 5,706,896 A | 1/1998 | Tubel et al. | | 166/313 |
| 5,720,881 A | 2/1998 | Derrick et al. | | 210/388 |
| 5,730,219 A | 3/1998 | Tubel et al. | | 166/250.01 |
| 5,732,776 A | 3/1998 | Tubel et al. | | 166/250.15 |
| 5,732,828 A | 3/1998 | Littlefield, Jr. | | 209/365.1 |
| 5,771,601 A | 6/1998 | Veal et al. | | 34/314 |
| 5,772,573 A | 6/1998 | Hao | | 494/15 |
| 5,783,077 A | 7/1998 | Bakula | | 210/388 |
| 5,791,494 A | 8/1998 | Meyer | | 209/368 |
| 5,793,705 A | 8/1998 | Gazis et al. | | 367/98 |
| 5,811,003 A | 9/1998 | Young et al. | | 210/388 |
| 5,814,218 A | 9/1998 | Cagle | | 210/388 |
| 5,814,230 A | 9/1998 | Willis et al. | | 210/710 |
| 5,816,413 A | 10/1998 | Boccabella et al. | | 209/399 |
| 5,819,952 A | 10/1998 | Cook et al. | | 209/400 |
| 5,839,521 A | 11/1998 | Reddoch | | 100/37 |
| 5,857,955 A | 1/1999 | Phillips | | 494/7 |
| 5,861,362 A | 1/1999 | Mayeux et al. | | 507/104 |
| 5,868,125 A | 2/1999 | Maoujoud | | 125/15 |
| 5,868,929 A | 2/1999 | Derrick et al. | | 210/388 |
| 5,876,552 A | 3/1999 | Bakula | | 156/308 |
| 5,896,998 A | 4/1999 | Bjorklund et al. | | 209/326 |
| 5,899,844 A | 5/1999 | Eberle, Sr. | | 494/37 |
| 5,913,767 A | 6/1999 | Feldkamp et al. | | 494/4 |
| 5,919,123 A | 7/1999 | Phillips | | 494/7 |
| 5,942,130 A | 8/1999 | Leung | | 210/784 |
| 5,944,197 A | 8/1999 | Baltzer et al. | | 209/400 |
| 5,944,993 A | 8/1999 | Derrick et al. | | 210/388 |
| 5,948,256 A | 9/1999 | Leung | | 210/374 |
| 5,948,271 A | 9/1999 | Wardwell et al. | | 210/739 |
| 5,952,569 A | 9/1999 | Jervis et al. | | 73/152.01 |
| 5,955,666 A | 9/1999 | Mullins | | 73/152.18 |
| 5,958,235 A | 9/1999 | Leung | | 210/374 |
| 5,958,236 A | 9/1999 | Bakula | | 210/388 |
| 5,971,159 A | 10/1999 | Leone et al. | | 209/399 |
| 5,971,307 A | 10/1999 | Davenport | | 241/259.1 |
| 5,975,204 A | 11/1999 | Tubel et al. | | 166/250.15 |
| 5,992,519 A | 11/1999 | Ramakrishnan et al. | | 166/250.15 |
| 6,000,556 A | 12/1999 | Bakula | | 210/388 |
| 6,012,016 A | 1/2000 | Bilden et al. | | 702/12 |
| 6,013,158 A | 1/2000 | Wootten | | 202/99 |
| 6,021,377 A | 2/2000 | Dubinsky et al. | | 702/9 |
| 6,024,228 A | 2/2000 | Williams | | 209/272 |
| 6,032,806 A | 3/2000 | Leone et al. | | 209/402 |
| 6,045,070 A | 4/2000 | Davenport | | 241/60 |
| 6,053,332 A | 4/2000 | Bakula | | 210/388 |
| 6,062,070 A | 5/2000 | Maltby et al. | | 73/61.49 |
| 6,063,292 A | 5/2000 | Leung | | 210/739 |
| 6,089,380 A | 7/2000 | Hazrati et al. | | 210/411 |
| 6,102,310 A | 8/2000 | Davenport | | 241/21 |
| 6,105,689 A | 8/2000 | McGuire et al. | | 175/48 |
| 6,109,452 A | 8/2000 | Leung et al. | | 210/369 |
| 6,110,096 A | 8/2000 | Leung et al. | | 494/53 |
| 6,123,656 A | 9/2000 | Michelsen | | 494/54 |
| 6,138,834 A | 10/2000 | Southall | | 209/17 |
| 6,143,183 A | 11/2000 | Wardwell et al. | | 210/739 |
| 6,145,669 A | 11/2000 | Leung | | 210/374 |
| 6,155,428 A | 12/2000 | Bailey et al. | | 209/315 |
| 6,161,700 A | 12/2000 | Bakula | | 209/401 |
| 6,165,323 A | 12/2000 | Shearer | | 162/251 |
| 6,170,580 B1 | 1/2001 | Reddoch | | 175/66 |
| 6,173,609 B1 | 1/2001 | Modlin et al. | | 73/293 |
| 6,176,323 B1 | 1/2001 | Weirich et al. | | 175/40 |
| 6,179,128 B1 | 1/2001 | Seyffert | | 209/405 |
| 6,192,742 B1 | 2/2001 | Miwa et al. | | 73/40 |
| 6,192,980 B1 | 2/2001 | Tubel et al. | | 166/65.1 |
| 6,217,830 B1 | 4/2001 | Roberts et al. | | 422/140 |
| 6,220,448 B1 | 4/2001 | Bakula et al. | | 209/392 |
| 6,220,449 B1 | 4/2001 | Schulte, Jr. et al. | | 209/401 |
| 6,223,906 B1 | 5/2001 | Williams | | 210/400 |
| 6,233,524 B1 | 5/2001 | Harrell et al. | | 702/9 |
| 6,234,250 B1 | 5/2001 | Green et al. | | 166/250.03 |
| 6,237,404 B1 | 5/2001 | Crary et al. | | 73/152.03 |
| 6,237,780 B1 | 5/2001 | Schulte | | 210/388 |
| 6,267,250 B1 | 7/2001 | Leung et al. | | 210/369 |
| 6,279,471 B1 | 8/2001 | Reddoch | | 100/37 |
| D448,488 S | 9/2001 | Chaffiotte et al. | | D24/219 |
| 6,283,302 B1 | 9/2001 | Schulte et al. | | 209/399 |
| 6,290,636 B1 | 9/2001 | Hiller, Jr. et al. | | 494/53 |
| 6,308,787 B1 | 10/2001 | Alft | | 175/48 |
| 6,315,894 B1 | 11/2001 | Wiemers et al. | | 210/96.1 |
| 6,333,700 B1 | 12/2001 | Thomeer et al. | | 340/854.8 |
| 6,346,813 B1 | 2/2002 | Kleinberg | | 324/303 |
| 6,349,834 B1 | 2/2002 | Carr et al. | | 209/366.5 |
| 6,352,159 B1 | 3/2002 | Loshe | | 209/268 |
| 6,356,205 B1 | 3/2002 | Salvo et al. | | 340/853.3 |
| 6,367,633 B1 | 4/2002 | Douglas | | 209/311 |
| 6,368,264 B1 | 4/2002 | Phillips et al. | | 494/5 |
| 6,371,301 B1 | 4/2002 | Schulte et al. | | 209/405 |
| 6,371,306 B2 | 4/2002 | Adams et al. | | 320/388 |
| 6,378,628 B1 | 4/2002 | McGuire et al. | | 175/48 |

(56) References Cited

U.S. PATENT DOCUMENTS

| | | | |
|---|---|---|---|
| 6,393,363 B1 | 5/2002 | Wilt et al. | 702/6 |
| 6,399,851 B1 | 6/2002 | Siddle | 203/87 |
| 6,401,934 B1* | 6/2002 | Largent | B01D 29/012 209/269 |
| 6,408,953 B1 | 6/2002 | Goldman et al. | 175/39 |
| 6,412,644 B1 | 7/2002 | Crabbe et al. | 209/309 |
| 6,429,653 B1 | 8/2002 | Kruspe et al. | 324/303 |
| 6,431,368 B1 | 8/2002 | Carr | 209/405 |
| 6,438,495 B1 | 8/2002 | Chau et al. | 702/9 |
| 6,439,391 B1 | 8/2002 | Seyffert | 209/238 |
| 6,439,392 B1 | 8/2002 | Baltzer | 209/405 |
| 6,461,286 B1 | 10/2002 | Beatley | 494/8 |
| 6,474,143 B1 | 11/2002 | Herod | 73/54.01 |
| 6,484,088 B1 | 11/2002 | Reimer | 701/123 |
| 6,484,885 B1 | 11/2002 | Lilie et al. | |
| 6,485,640 B2 | 11/2002 | Fout et al. | 210/188 |
| 6,505,682 B2 | 1/2003 | Brockman | 166/250.15 |
| 6,506,310 B1 | 1/2003 | Kulbeth | 210/780 |
| 6,510,947 B1 | 1/2003 | Schulte et al. | 210/388 |
| 6,513,664 B1 | 2/2003 | Logan et al. | 209/367 |
| 6,517,733 B1 | 2/2003 | Carlson | 210/785 |
| 6,519,568 B1 | 2/2003 | Harvey et al. | 705/1 |
| 6,530,482 B1 | 3/2003 | Wiseman | 209/253 |
| 6,536,540 B2 | 3/2003 | deBoer | 175/70 |
| 6,553,316 B2 | 4/2003 | Bary et al. | 702/16 |
| 6,553,336 B1 | 4/2003 | Johnson et al. | 702/188 |
| 6,575,304 B2 | 6/2003 | Cudahy | 209/365.3 |
| 6,581,455 B1 | 6/2003 | Berger et al. | 73/152.55 |
| 6,600,278 B1 | 7/2003 | Bretzius | 318/34 |
| 6,601,709 B2 | 8/2003 | Schulte et al. | 209/397 |
| 6,605,029 B1 | 8/2003 | Koch et al. | 494/53 |
| 6,662,952 B2 | 12/2003 | Adams et al. | 209/319 |
| 6,669,027 B1 | 12/2003 | Mooney et al. | 209/405 |
| 6,679,385 B2 | 1/2004 | Suter et al. | 209/367 |
| 6,691,025 B2 | 2/2004 | Reimer | 701/123 |
| 6,692,599 B2 | 2/2004 | Cook et al. | 156/94 |
| 6,693,553 B1 | 2/2004 | Ciglenec et al. | 340/853.1 |
| 6,715,612 B1 | 4/2004 | Krystof | 209/331 |
| 6,722,504 B2 | 4/2004 | Schulte et al. | 209/359 |
| 6,746,602 B2 | 6/2004 | Fout et al. | 210/188 |
| 6,763,605 B2 | 7/2004 | Reddoch | 34/58 |
| 6,766,254 B1 | 7/2004 | Bradford et al. | 702/9 |
| 6,769,550 B2 | 8/2004 | Adams et al. | 209/399 |
| 6,780,147 B2 | 8/2004 | Koch et al. | 494/53 |
| 6,783,088 B1 | 8/2004 | Gillis et al. | 241/19 |
| 6,783,685 B2 | 8/2004 | Hwang | 210/690 |
| 6,790,169 B2 | 9/2004 | Koch et al. | 494/53 |
| 6,793,814 B2 | 9/2004 | Fout et al. | 210/188 |
| 6,808,626 B2 | 10/2004 | Kulbeth | 210/241 |
| 6,825,136 B2 | 11/2004 | Cook et al. | 442/6 |
| 6,827,223 B2 | 12/2004 | Colgrove et al. | 209/365.3 |
| 6,838,008 B2 | 1/2005 | Fout et al. | 210/780 |
| 6,860,845 B1 | 3/2005 | Miller et al. | 494/1 |
| 6,863,183 B2 | 3/2005 | Schulte et al. | 209/405 |
| 6,863,809 B2 | 3/2005 | Smith et al. | 210/202 |
| 6,868,920 B2 | 3/2005 | Hoteit et al. | 175/25 |
| 6,868,972 B2 | 3/2005 | Seyffert et al. | 209/254 |
| 6,873,267 B1 | 3/2005 | Tubel et al. | 340/853.3 |
| 6,892,812 B2 | 5/2005 | Niedermayr et al. | 166/250.15 |
| 6,896,055 B2 | 5/2005 | Koithan | 166/250.15 |
| 6,899,178 B2 | 5/2005 | Tubel | 166/313 |
| 6,905,452 B1 | 6/2005 | Kirsch | 494/8 |
| 6,907,375 B2 | 6/2005 | Guggari et al. | 702/113 |
| 6,926,101 B2 | 8/2005 | deBoer | 175/70 |
| 6,932,169 B2 | 8/2005 | Wylie et al. | 175/66 |
| 6,932,757 B2 | 8/2005 | Beattey | 494/55 |
| 6,971,982 B1 | 12/2005 | Kirsch | 494/8 |
| 6,981,940 B2 | 1/2006 | Rafferty | 494/7 |
| 7,001,324 B2 | 2/2006 | Hensley et al. | 494/53 |
| 7,018,326 B2 | 3/2006 | Koch et al. | 494/53 |
| 7,041,044 B2 | 5/2006 | Gilbert | 494/53 |
| D524,825 S | 7/2006 | Koch et al. | D15/21 |
| 7,093,678 B2 | 8/2006 | Risher et al. | 175/66 |
| 7,144,516 B2 | 12/2006 | Smith | 210/803 |
| 7,175,027 B2 | 2/2007 | Strong et al. | 209/405 |
| 7,195,084 B2 | 3/2007 | Burnett et al. | 175/66 |
| 7,198,156 B2 | 4/2007 | Schulte et al. | 209/309 |
| 7,216,767 B2 | 5/2007 | Schulte et al. | 209/309 |
| 7,228,971 B2 | 6/2007 | Mooney et al. | 209/396 |
| 7,264,125 B2 | 9/2007 | Lipa | 209/397 |
| 7,284,665 B2 | 10/2007 | Fuchs | 209/270 |
| 7,303,079 B2 | 12/2007 | Reid-Robertson et al. | 209/405 |
| 7,306,057 B2 | 12/2007 | Strong et al. | 175/66 |
| 7,316,321 B2 | 1/2008 | Robertson et al. | 209/400 |
| 7,337,860 B2 | 3/2008 | McIntyre | 175/66 |
| 7,373,996 B1 | 5/2008 | Martin et al. | 175/206 |
| 7,387,602 B1 | 6/2008 | Kirsch | 494/8 |
| 7,514,011 B2 | 4/2009 | Kulbeth | 210/780 |
| 7,540,837 B2 | 6/2009 | Scott et al. | 494/7 |
| 7,540,838 B2 | 6/2009 | Scott et al. | 494/7 |
| 7,581,569 B2 | 9/2009 | Beck | 139/425 R |
| 7,770,665 B2 | 8/2010 | Eia et al. | 175/66 |
| 2001/0032815 A1 | 10/2001 | Adams et al. | 210/388 |
| 2002/0000399 A1 | 1/2002 | Winkler et al. | 209/399 |
| 2002/0018399 A1 | 2/2002 | Schultz et al. | 361/81 |
| 2002/0033278 A1 | 3/2002 | Reddoch | 175/57 |
| 2002/0033358 A1 | 3/2002 | Bakula | 209/331 |
| 2002/0035551 A1 | 3/2002 | Sherwin et al. | 705/412 |
| 2002/0065698 A1 | 5/2002 | Schick et al. | 705/8 |
| 2002/0112888 A1 | 8/2002 | Leuchtenberg | 175/48 |
| 2002/0134709 A1 | 9/2002 | Riddle | 209/238 |
| 2003/0015351 A1 | 1/2003 | Goldman et al. | 175/39 |
| 2003/0038734 A1 | 2/2003 | Hirsch et al. | 340/853.1 |
| 2003/0109951 A1 | 6/2003 | Hsiung et al. | 700/108 |
| 2003/0220742 A1 | 11/2003 | Niedermayr et al. | 702/9 |
| 2004/0040746 A1 | 3/2004 | Niedermayr et al. | 175/38 |
| 2004/0051650 A1 | 3/2004 | Gonsoulin et al. | 340/853.1 |
| 2004/0156920 A1 | 8/2004 | Kane | 424/725 |
| 2004/0245155 A1 | 12/2004 | Strong et al. | 209/405 |
| 2005/0067327 A1 | 3/2005 | Adams et al. | 209/408 |
| 2005/0103689 A1 | 5/2005 | Schulte, Jr. et al. | 209/405 |
| 2005/0199532 A1 | 9/2005 | Schulte et al. | |
| 2005/0236305 A1 | 10/2005 | Schulte, Jr. et al. | 209/403 |
| 2005/0247612 A1 | 11/2005 | Glassheim | |
| 2005/0255186 A1 | 11/2005 | Hiraga | 425/542 |
| 2006/0019812 A1 | 1/2006 | Stalwick | 494/42 |
| 2006/0034988 A1 | 2/2006 | Bresnahan et al. | 426/502 |
| 2006/0081508 A1 | 4/2006 | Astleford et al. | 209/309 |
| 2006/0102390 A1 | 5/2006 | Burnett et al. | 175/66 |
| 2006/0105896 A1 | 5/2006 | Smith et al. | 494/7 |
| 2006/0144779 A1 | 7/2006 | Bailey | 210/330 |
| 2007/0108105 A1 | 5/2007 | Burnett | |
| 2007/0108106 A1 | 5/2007 | Burnett | 209/325 |
| 2007/0131592 A1 | 6/2007 | Browne et al. | 209/399 |
| 2008/0078697 A1 | 4/2008 | Carr | 209/49 |
| 2008/0078702 A1 | 4/2008 | Carr et al. | 209/326 |
| 2008/0078704 A1 | 4/2008 | Carr et al. | 209/399 |
| 2008/0093269 A1 | 4/2008 | Timmerman et al. | 209/405 |
| 2008/0179090 A1 | 7/2008 | Eia et al. | 175/5 |
| 2008/0179096 A1 | 7/2008 | Eia et al. | 175/66 |
| 2008/0179097 A1 | 7/2008 | Eia et al. | 175/66 |
| 2009/0071878 A1 | 3/2009 | Bosse | 209/391 |
| 2009/0105059 A1 | 4/2009 | Dorry et al. | 494/37 |
| 2009/0178978 A1 | 7/2009 | Beebe et al. | 210/747 |
| 2009/0242466 A1 | 10/2009 | Burnett et al. | 209/555 |
| 2009/0286098 A1 | 11/2009 | Yajima et al. | 428/507 |
| 2009/0316084 A1 | 12/2009 | Yajima et al. | 349/96 |
| 2010/0084190 A1 | 4/2010 | Eia et al. | 175/5 |
| 2010/0089802 A1 | 4/2010 | Burnett | 209/360 |
| 2010/0119570 A1 | 5/2010 | Potter et al. | 424/422 |
| 2010/0181265 A1 | 7/2010 | Schulte, Jr. et al. | |
| 2010/0237024 A1 | 9/2010 | Carr et al. | 210/780 |

FOREIGN PATENT DOCUMENTS

| | | |
|---|---|---|
| FR | 2 636 669 | 3/1990 |
| GB | 1 526 663 | 9/1978 |
| GB | 2 030 482 A | 4/1980 |
| GB | 1 578 948 | 11/1980 |
| GB | 2 176 424 A | 12/1986 |
| GB | 2 327 442 A | 1/1999 |
| GB | 2 408 006 B | 4/2007 |
| JP | 55112761 | 8/1980 |
| JP | 59069268 | 4/1984 |

(56) References Cited

FOREIGN PATENT DOCUMENTS

| | | |
|---|---|---|
| JP | 63003090 | 1/1988 |
| JP | 63283860 | 11/1988 |
| JP | 63290705 | 11/1988 |
| JP | 02127030 | 5/1990 |
| JP | 02167834 | 6/1990 |
| JP | 03240925 | 10/1991 |
| JP | 03264263 | 11/1991 |
| JP | 04093045 | 3/1992 |
| JP | 04269170 | 9/1992 |
| JP | 05043884 | 2/1993 |
| JP | 05301158 | 11/1993 |
| JP | 06063499 | 3/1994 |
| JP | 07304028 | 11/1995 |
| JP | 08039428 | 2/1996 |
| JP | 08270355 | 10/1996 |
| JP | 09109032 | 4/1997 |
| JP | 10337598 | 12/1998 |
| WO | WO96/08301 | 3/1996 |
| WO | WO96/33792 | 3/1996 |
| WO | WO98/10895 | 3/1998 |
| WO | WO98/16328 | 3/1998 |
| WO | 02/34358 | 5/2002 |
| WO | WO02/49778 | 6/2002 |
| WO | WO03/055569 | 7/2003 |
| WO | WO2004/110589 A1 | 12/2004 |
| WO | WO2005/107963 A2 | 11/2005 |
| WO | WO2007/070559 A2 | 6/2007 |
| WO | WO2008/042844 A1 | 4/2008 |
| WO | WO2009/048783 A2 | 4/2009 |

OTHER PUBLICATIONS

U.S. Appl. No. 12/321,358 Office Action dated Aug. 29, 2011.
U.S. Appl. No. 12/321,358 Final Office Action dated Jan. 18, 2012.
U.S. Appl. No. 12/321,358 Office Action dated Sep. 23, 2013.
U.S. Appl. No. 12/321,358 Office Action dated Aug. 4, 2014.
Related U.S. Appl. No. 12/321,358 Office Action dated Feb. 5, 2015.
U.S. Appl. No. 12/785,735 Office Action dated Dec. 9, 2011.
U.S. Appl. No. 12/490,492 Office Action dated Oct. 7, 2011.
U.S. Appl. No. 12/481,959 Final Office Action dated Oct. 27, 2010.
U.S. Appl. No. 12/481,959 Office Action dated Jun. 7, 2010.
U.S. Appl. No. 12/469,851 Final Office Action dated Nov. 9, 2010.
U.S. Appl. No. 12/469,851 Office Action dated Jun. 28, 2010.
U.S. Appl. No. 12/287,716 Office Action dated Jun. 17, 2011.
U.S. Appl. No. 12/287,709 Office Action dated Mar. 29, 2011.
U.S. Appl. No. 12/231,293 Office Action dated Sep. 13, 2011.
U.S. Appl. No. 12/228,670 Office Action dated Jun. 20, 2011.
U.S. Appl. No. 12/227,462 Final Office Action dated May 26, 2011.
U.S. Appl. No. 12/227,462 Office Action dated Nov. 15, 2010.
U.S. Appl. No. 12/008,980 Office Action dated Aug. 31, 2011.
U.S. Appl. No. 12/008,980 Office Action dated Apr. 5, 2011.
U.S. Appl. No. 12/001,479 Final Office Action dated Oct. 31, 2011.
U.S. Appl. No. 12/001,479 Office Action dated Jun. 8, 2011.
U.S. Appl. No. 11/897,976 Final Office Action dated Sep. 1, 2010.
U.S. Appl. No. 11/897,976 Office Action dated Apr. 1, 2010.
U.S. Appl. No. 11/897,975 Final Office Action dated Oct. 23, 2012.
U.S. Appl. No. 11/897,975 Office Action dated Jun. 8, 2012.
U.S. Appl. No. 11/897,975 Final Office Action dated Aug. 12, 2011.
U.S. Appl. No. 11/897,975 Office Action dated Mar. 1, 2011.
U.S. Appl. No. 11/897,975 Final Office Action dated Jul. 21, 2010.
U.S. Appl. No. 11/897,975 Office Action dated Feb. 19, 2010.
U.S. Appl. No. 11/637,615 Final Office Action dated Nov. 16, 2011.
U.S. Appl. No. 11/637,615 Office Action dated Jul. 21, 2011.
U.S. Appl. No. 11/637,615 Final Office Action dated Aug. 2, 2010.
U.S. Appl. No. 11/637,615 Office Action dated Mar. 2, 2010.
International Search Report and Written Opinion from PCT/GB2008/050761 dated Sep. 17, 2009.
International Search Report and Written Opinion from PCT/GB2010/051050 dated Jan. 30, 2012.
International Search Report from PCT/GB2011/050975 dated Nov. 15, 2012.
EP Application No. 07 733 775.6 EPC Communication dated Dec. 9, 2010.
Polyamide 6/6—Nylon 6/6—PA 6/6 60% Glass Fibre Reinforced, Data Sheet [online], AZoM™, The A to Z of Materials and AZojomo, The "AZo Journal of Materials Online" [retrieved on Nov. 23, 2005] (2005) (Retrieved from the Internet: <URL: http://web.archive.org/web/20051123025735/http://www.azom.com/details.asp?ArticleID=493>.
Adams et al., "The Advanced Technology Linear Separator Model ATL-1000," Drexel Oilfield Services, STC 03, 18 pages (1991).
AMS 2000 Description, Thule Rigtech, Rig Technology, 18 pages (2000).
Automated Chemical Additive System, Thule Rigtech, Rig Technology Ltd., 4 pages (2000).
Brandt Automated Shaker Control, Varco, 1 page (2002).
Brandt®, A Varco Company, King Cobra Series, Installation, Operation, and Maintenance Manual, M12444 R5, 65 pages (2003).
Brandt®, A Varco Company, LCM-2D LP Installation and Operation Manual, 84 pages (1998).
Brandt et al., Mud Equipment Manual—Handbook 3: Shale Shakers, Gulf Pub. Co., 18 pages (1982).
The Derrick LP Sandwich Shaker, Derrick Equipment Company, 4 pages (1981).
Fluid Systems Inc., The Prodigy Series I™ Dynamic Control Shaker, 2 pages (Apr. 27, 2004).
Sweco® Oilfield Services, LM-3 Full-Flo™ Shale Shaker, 4 pages (1991).
Axiom Ax-1 Shaker Brochure, 24 pages (2010).
Brandt, VSM-300™ Shaker Brochure, 4 pages (2001).
Brandt, VSM-Ultra Shaker Brochure, 2 pages (2003).

* cited by examiner

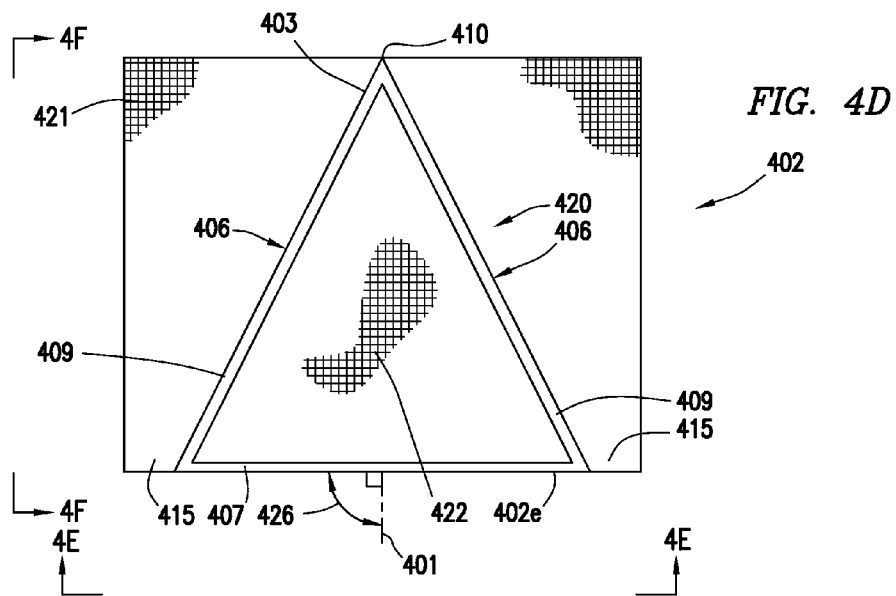
FIG. 4D
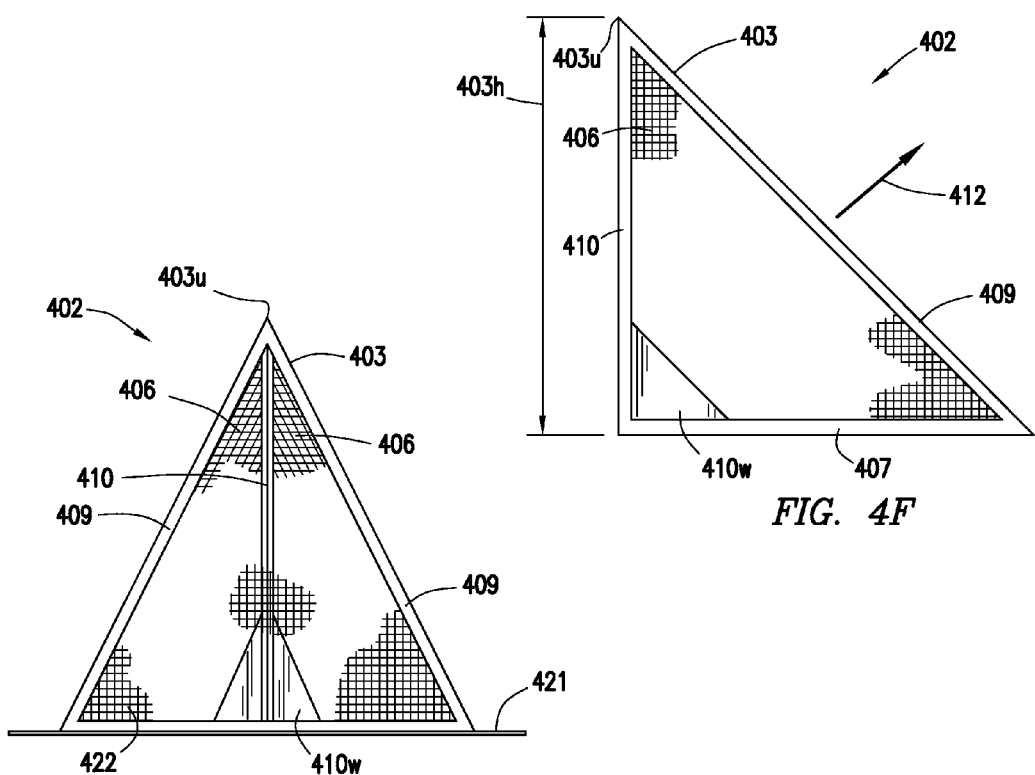
FIG. 4F
FIG. 4E

VECTOR MAXIMIZING SCREEN

BACKGROUND

1. Field of the Disclosure

The present disclosure is generally directed to various methods and apparatuses that may be used for vibratory separation of materials, and in particular to various screens for vibratory separation devices that may be configured to increase and/or maximize the effect of forces generated by vibratory separation devices.

2. Description of the Related Art

Vibratory separation devices are used in a wide variety of industries to separate materials such as liquids from solids or solids from solids. One type of vibratory separation device that is often used to separate materials during well drilling operations, such as oil in gas well drilling operations and the like, is known as a shale shaker. On many drilling rigs, a shale shaker is typically the first equipment component that is used to treat drilling fluid mixtures returning from the wellbore, and are used to remove undesirable solids materials, such as drill cuttings, from the fluid, i.e., drilling mud, that is used to drill the well.

In general, a shale shaker includes a box-like frame, called a basket, which receives the material to be separated, e.g., a mixture of drill cuttings and drilling mud or fluid. A deck, or other screen holding or mounting structure, is supported within the basket and includes one or more screen sections that remove solid particles from fluid as the fluid passes through the screen. A vibrating apparatus is coupled to the shale shaker to vibrate the screens to enhance the separation process.

In operation, the mixture of drill cuttings and drilling fluid is fed into the shale shaker on top of the screen sections, and particles that are larger than the openings in the screen section are caught on top of the screen. The shale shaker is configured to vibrate the screen in such a manner that the particles caught by the screen are moved along, and eventually off of, the screen section. Therefore, the screen sections must be configured to process a high volume of fluid, separate particles of various different sizes from the fluid, and withstand the high forces that are generated by the vibration of the shale shaker and movement of the drill cuttings and drilling fluid.

Accordingly, there is a continuing need in the art to develop new methods and separation apparatuses that may provide screen sections that mitigate, or even overcome, these and other limitations of existing methods and separation equipment.

SUMMARY OF THE DISCLOSURE

The following presents a simplified summary of the present disclosure in order to provide a basic understanding of some aspects disclosed herein. This summary is not an exhaustive overview of the disclosure, nor is it intended to identify key or critical elements of the subject matter disclosed here. Its sole purpose is to present some concepts in a simplified form as a prelude to the more detailed description that is discussed later.

Generally, the present disclosure is directed to various methods and apparatuses that may be used for vibratory separation of materials, and in particular to various screens for vibratory separation devices that may be configured to increase the operating efficiency thereof. One illustrative embodiment disclosed herein is a screen panel assembly that includes, among other things, a screen panel and one or more raised screen components, wherein at least one of the raised screen components is disposed on the screen panel. Furthermore, each of the one or more raised screen components includes at least one inclined screen surface that defines a first plane that is oriented at a first angle relative to said screen panel. Additionally, the first plane is substantially aligned with a second plane that is oriented at a second angle relative to a third plane that is perpendicular to a displacement vector along which the screen panel assembly is accelerated by a vibratory separation device.

In another illustrative embodiment of the present disclosure, a screen panel assembly includes a plurality of screen panels and a plurality of raised screen components, wherein at least one of the plurality of raised screen components is disposed on each of the plurality of screen panels. Additionally, each of the plurality of raised screen components includes one or more inclined screen surfaces having a first edge that is aligned with a respective one of the plurality of screen panels and a second edge that extends upward from a top surface of the respective screen panel. Furthermore, each of the one or more inclined screen surfaces defines a first plane that is oriented at a first angle relative to the respective screen panel and is substantially aligned with a second plane that is oriented at a second angle relative to a third plane that is perpendicular to a displacement vector along which the screen panel assembly is accelerated by a vibratory separation device.

Also disclosed herein is an exemplary modular screen panel assembly that includes a plurality of modular screen sub-panels, wherein each one of the plurality of modular screen sub-panels has a base that is adapted to be interchangeably coupled to one or more other ones of the plurality of modular screen sub-panels. The disclosed modular screen panel assembly further includes, among other things, a plurality of modular raised screen components, wherein each of the plurality of modular raised screen components is adapted to be interchangeably coupled to the base of each of the plurality of modular screen sub-panels.

BRIEF DESCRIPTION OF THE DRAWINGS

The disclosure may be understood by reference to the following description taken in conjunction with the accompanying drawings, in which like reference numerals identify like elements, and in which:

FIGS. 4D-4F are plan, front, and side elevation views, respectively, of the illustrative raised screen component depicted in FIG. 4B;

Figure 1A:
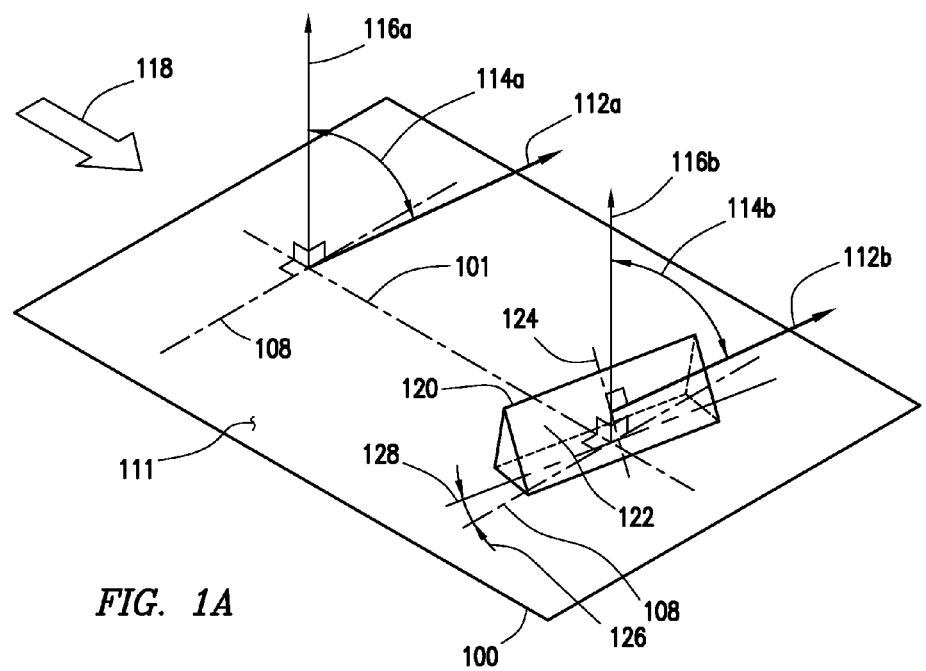
FIGS. 1A and 1B are a schematic isometric and plan views, respectively, of a screen panel having a raised screen component.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1B:
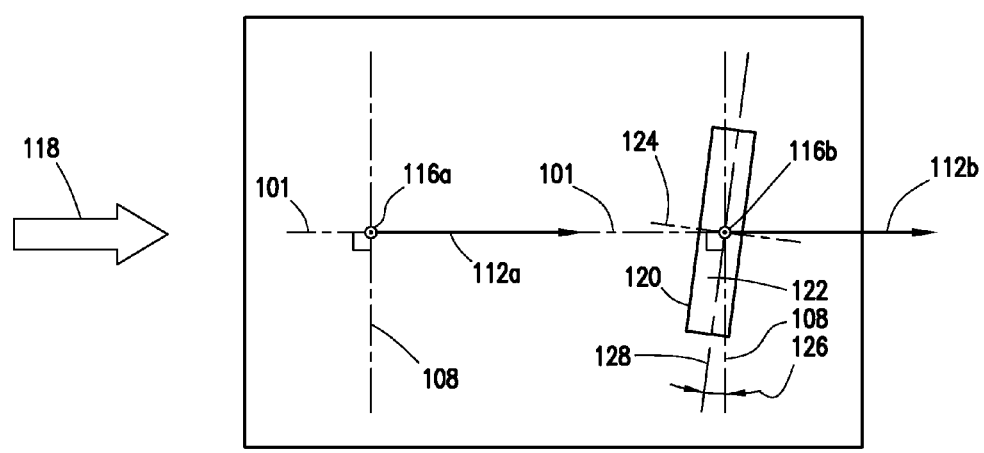

Referring initially to the schematically illustrated screen panel depicted in the isometric and plan views of FIGS. 1A and 1B, respectively, a screen panel 100 is shown as a substantially planar body that is substantially aligned with a plane 111. Typically the screen panel 100 may include one or more layers of screening material (not shown for clarity), e.g., wire mesh screen, that is disposed along an upper surface of the screen panel 100. In operation, the screen panel 100 may be subjected to a vibrational acceleration along a displacement vector 112a that may be at an angle 114a relative to a vector 116a that is substantially perpendicular to the plane 111 of the screen panel 100. Furthermore, a material mixture, e.g., a drilling fluid and drill cuttings mixture, may be directed onto the screen panel 100 in a flow direction 118 that is substantially parallel to a longitudinal axis 101 of the screen panel 100. As the material mixture moves along the screen panel 100 in the direction 118, the vibration of the screen panel 100 may accelerate the material mixture along the displacement vector 112a. This vibrational acceleration results in a force that acts to push at least a portion of the fluid through openings in the screening material on the screen panel 100, while the screen material may act to prevent solid particles larger than the openings in the screening material from passing through the screen panel 100.

Generally, the angle 114a of the displacement vector 112a relative to the vector 116a (which may be substantially perpendicular to the plane 111 of the screen panel 100) may be dependent on the design parameters of the specific vibratory separation device, such as a shale shaker and the like, in which the screen panel 100 may be installed. For example, in certain illustrative embodiments, the angle 114a of the displacement vector 112a may be between approximately 35° and 55° relative to the vector 116a. It should be appreciated, however, that the angle 114a of the displacement vector 112a may be less than approximately 35° or greater than approximately 55°, depending on the design of the vibratory separation device wherein the screen panel 100 is installed.

As is schematically depicted in FIGS. 1A and 1B, the screen panel 100 may include a raised screen component 120 having an inclined front surface 122. In some illustrative embodiments, the raised screen component may be at least partially constructed from screening material that is adapted to allow fluid to pass therethrough, as described above. For example, at least the inclined front surface 122 of the raised screen component may be include screening material (not shown) disposed thereon. Furthermore, in certain embodiments, the inclined screen surface 122 may be inclined relative to the plane 111 of the screen panel such that the inclined screen surface 122 is aligned with a plane that is substantially perpendicular to a vibrational acceleration displacement vector 112b. As is described with respect to the displacement vector 112a above, the displacement vector 112b may be at an angle 114b relative to a vector 116b that is also substantially perpendicular to the plane 111 of the screen panel 100. Therefore, it should be appreciated by those of ordinary skill in the art after a complete reading of the present disclosure that the displacement vector 112*b* may be substantially parallel to the displacement vector 112*a*.

In certain exemplary embodiments, orienting the inclined screen surface 122 such that it is aligned with a plane that is substantially perpendicular to the displacement vector 112*b* may act to effectively increase the total screen area that is available for processing the fluid mixture. Furthermore, in those illustrative embodiments wherein multiple layers of screening material may be disposed on the inclined screen surface 122, aligning the inclined screen surface 122 as described above may also reduce the amount of frictional wear between the multiple layers of screening material, as may be caused by the various screening material layers moving relative to one other during operation. Moreover, aligning the inclined screen surface 122 in this fashion may also increase the effective capacity of the screen panel 100 as compared with a conventional planar screen, i.e., a screen panel without raised screen components 120.

As noted previously, the inclined screen surface 122 may be aligned with a plane that is substantially perpendicular to the displacement vector 112*b*, which in turn is generally substantially parallel to the longitudinal axis 101 of the screen panel 100. As illustrated in FIGS. 1A and 1B, the lines 108 indicate the direction of a plane that is arranged exactly perpendicular to the longitudinal axis 101, and to the displacement vectors 112*a* and 112*b*. However, for purposes of the present disclosure, the term "substantially perpendicular" when used with respect to the orientation of the inclined screen surface 122*b* relative to the longitudinal axis 101 is intended to mean an orientation that is close to, but not necessarily exactly, perpendicular to the longitudinal axis 101, as is the case with the planes which include the lines 108.

For example, in some exemplary embodiments, the inclined screen surface 122 may be aligned with a plane that includes the line 128, which may be at an angle 126 relative to the perpendicular line 108. In such embodiments, the displacement vector 112*b* may be rotated about an axis 124 that is contained within the plane of the inclined screen surface 122, wherein however the displacement vector 112*b* remains perpendicular to the axis 124. Therefore, in accordance with the present disclosure, the displacement vector 112*b* is considered to be "substantially perpendicular" to a plane that is aligned with the inclined screen surface 122 and includes the line 128, which may be at the 126 relative to the perpendicular line 108.

Therefore, in certain embodiments, the inclined screen surface 122 may be considered to be aligned with a plane that is "substantially perpendicular" to the displacement vector 112*b* when the inclined screen surface 122 is aligned with a plane that is oriented at an angle 126 relative the perpendicular line 108 that is less than approximately 45°. In other embodiments, the inclined screen surface 122 may be considered to be aligned with a plane that is "substantially perpendicular" to the displacement vector 112*b* when the inclined screen surface 122 is aligned with a plane that is oriented at an angle 126 that is less than approximately 22.5°. In still other illustrative embodiments, the inclined screen surface 122 may be considered to be aligned with a plane that is "substantially perpendicular" to the displacement vector 112*b* when the inclined screen surface 122 is aligned with a plane that is oriented at an angle 126 that is less than approximately 10°.

Figure 2A:
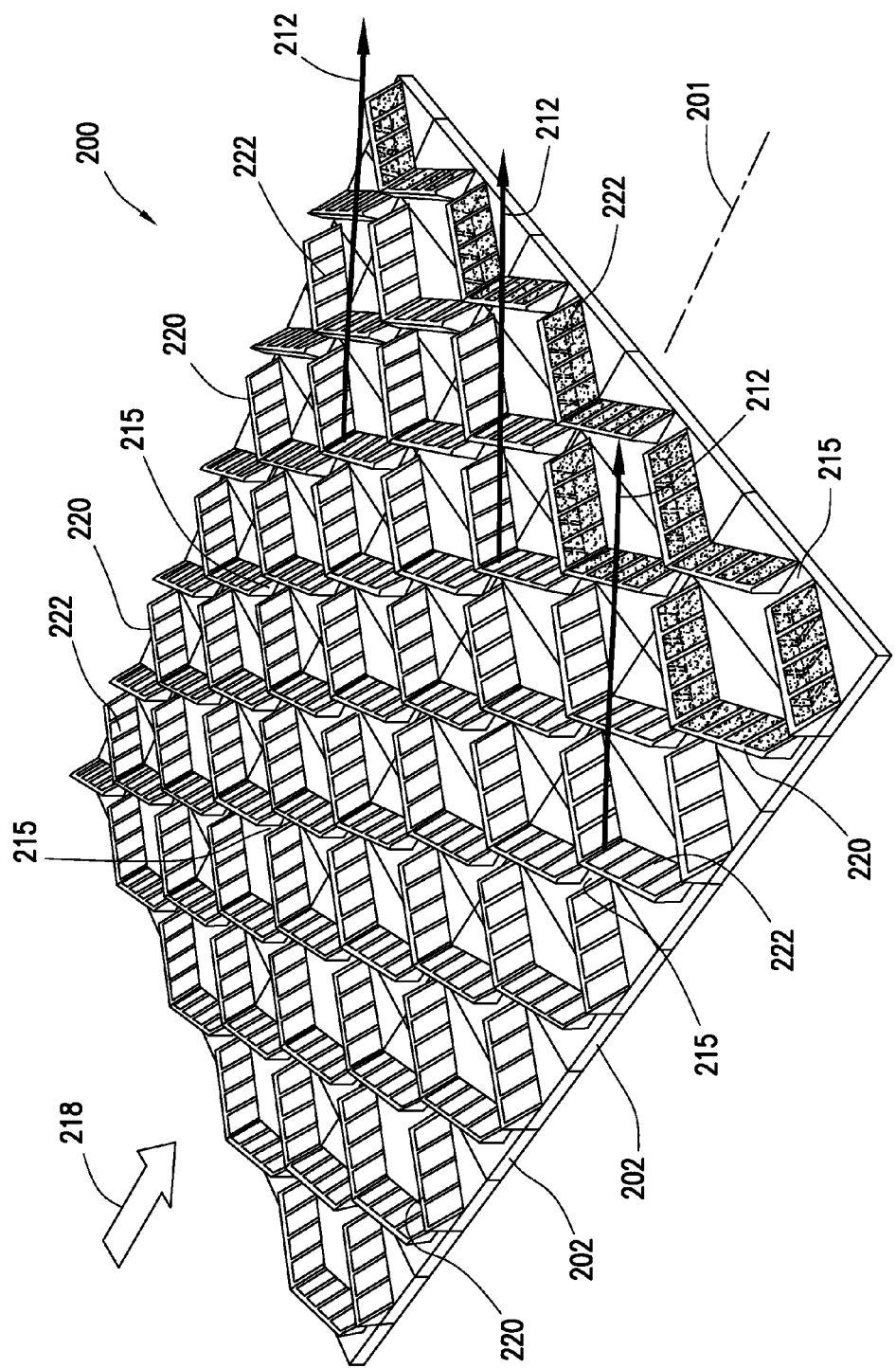
FIG. 2A is a perspective view of one exemplary embodiment of a screen panel assembly having a plurality of raised screen components.
Figure 2B:
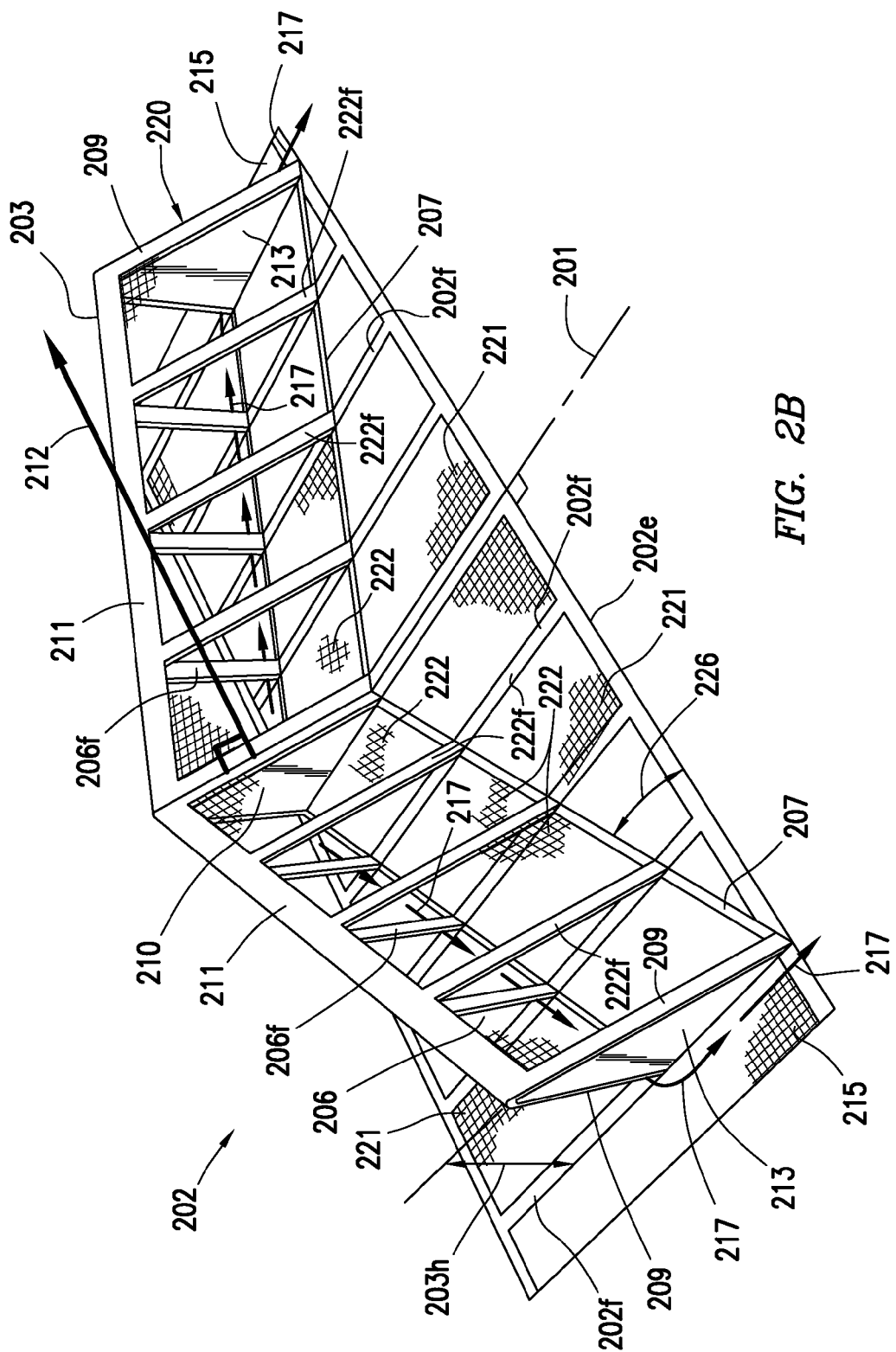
FIG. 2B is a close-up perspective view of a single raised screen component of the exemplary screen panel assembly illustrative in FIG. 2A.

FIG. 2A is a perspective view of an exemplary screen panel assembly 200 in accordance with the present disclosure, and FIG. 2B is a close-up perspective view of one illustrative raised screen component 220 of the screen panel assembly 200 shown in FIG. 2A. In some embodiments, the screen panel assembly 200 may include a plurality of individual screen panels 202, each of which may include a raised screen component 220, as will be described in further detail with respect to FIG. 2B below. In other embodiments, each screen panel 202 may include a plurality of raised screen components 220, e.g., two or more, coupled thereto, whereas in still further embodiments, the screen panel assembly 200 may include a substantially continuous single screen panel 202. In those embodiments wherein the screen panel assembly 200 includes a single substantially continuous screen panel 202, each of the plurality of raised screen components 202 may be coupled to the screen panel assembly 200, e.g., to the screen panel 202.

As shown in FIG. 2A, the raised screen components 220 may each have one or more inclined front screen surfaces 222, each of which may be arranged substantially perpendicular to a vibrational acceleration displacement vector 212 that is based on the operational characteristics of the vibratory separation device, e.g., a shale shaker (not shown), wherein the screen panel assembly 200 may be installed. As shown in FIG. 2A, the plurality of raised screen components 220 may be arranged across the screen panel assembly 200 in a staggered or offset pattern, such that the centerline of a given raised screen component 220 in one row of raised screen components 220 may be substantially aligned with a flow gap 215 between immediately adjacent pairs of raised screen components 220 in an upstream and a downstream row of raised screen components 220. See, FIG. 2C.

In some embodiments, a material mixture, e.g., drilling fluid and drill cuttings, may generally flow across the screen panel assembly 200 in a nominal material flow direction 218 that is substantially parallel to the longitudinal axis 201 of the screen panel assembly 200. However, in view of the staggered or offset pattern arrangement of the raised screen components 220, the material mixture may have a locally indirect or serpentine flow path 217, that is, wherein the material flows around each of the raised screen components 220, through the flow gaps 215 between each raised screen component 220, and then to the next row of raised screen components 220. See, FIGS. 2B and 2C.

As noted previously, in at least some embodiments, the screen panel 202 may include a single raised screen panel component 220 (as is shown in the illustrative embodiment depicted in FIG. 2B), whereas in other embodiments the screen panel 202 may include a plurality of raised screen panel components 220. Whether the screen panel 202 includes a single raised screen panel component 220 (as depicted in FIG. 2B) or a plurality of raised screen panel components 220, each of the raised screen panel assemblies may include one or more front side inclined screen surfaces 222, side panels 213, a wedge surface, or plow, 210, and one or more back side vertical screen surfaces 206. The raised screen panel assembly 220 may include a frame 203 that is adapted to support the inclined screen surfaces 222, the vertical screen surfaces 206, and the side panels 213. As shown in FIG. 2B, the frame 203 may include a lower, or first, edge 207 running along the bottom edge of the inclined screen surfaces 222 that may be aligned with the top surface of the screen panel 202. Additionally, the frame 203 may also include side, or second, edges 209 extending upward from the top surface of the screen panel 202 to a top, or third, edge 211, thereby forming a substantially triangularly shaped frame having a height 203*h* when viewed in cross section or from the side.

The height 203h of the frame 202 may be established based on the design parameters of the vibratory separator, e.g., shale shaker, where in the screen panel assembly 200 may be installed, such as the flow rate of material across the screen panel assembly 200, the anticipated depth of the pool of material on the screen panel assembly 200, the uphill angle at which the screen panel assembly 200 may be vibrated, and the like. For example, in certain exemplary embodiments, the height 203h may be in the range of approximately 1 inch to 3 inches, whereas in at least some embodiments the height may be approximately 2 inches. However, it should be appreciated that other heights 203h of the raised screen components 220 may also be used. Furthermore, is should also be understood that the height 203h of each of the raised screen components 220 may be different for each various screen panels 202 of the screen panel assembly 200, and/or the height 203h of the various raised screen components 220 on a given screen panel 202 may be different.

In certain embodiments, the frame 203 may include one or more inclined screen panel frame members 222f that are positioned between and adapted to support each of the inclined screen surfaces 222. In other embodiments, the frame 203 may include one or more vertical screen panel frame members 206f that are also positioned between and adapted to support each of the vertical screen surfaces 206. Additionally, the screen panel 202 may include screening material 221 disposed on the top surface thereof as well as a plurality of screen panel frame member 202f that are adapted to support the screening material 221.

As shown in FIG. 2B, the inclined screen surfaces 222 may be inclined with respect to the screen panel 202, i.e., perpendicular to the displacement vector 212, and furthermore may be aligned with a plane that is oriented at an angle 226 relative to a plane that is perpendicular to the longitudinal axis 201 and to the displacement vector 212, e.g., the front edge 202e of the panel 202, as previously described. In some illustrative embodiments, the angle 226 may be less than approximately 45°, and in certain other embodiments the angle 226 may be less than approximately 22.5°. Additionally, one or both of the side panels 213 and/or the wedge surface 210 may be a screened surface, e.g., screening material, whereas in other embodiments, the side panels 213 and/or the wedge surface 210 may be solid surfaces, e.g., sheet metal and the like. In other embodiments, the frame assembly 203 may be arranged such that the inclined screen surfaces 222 form a shallow sided "V" or chevron-shaped configuration, wherein the wedge surface 110 may be positioned at the intersection of the vertical screen surfaces.

Figure 2C:
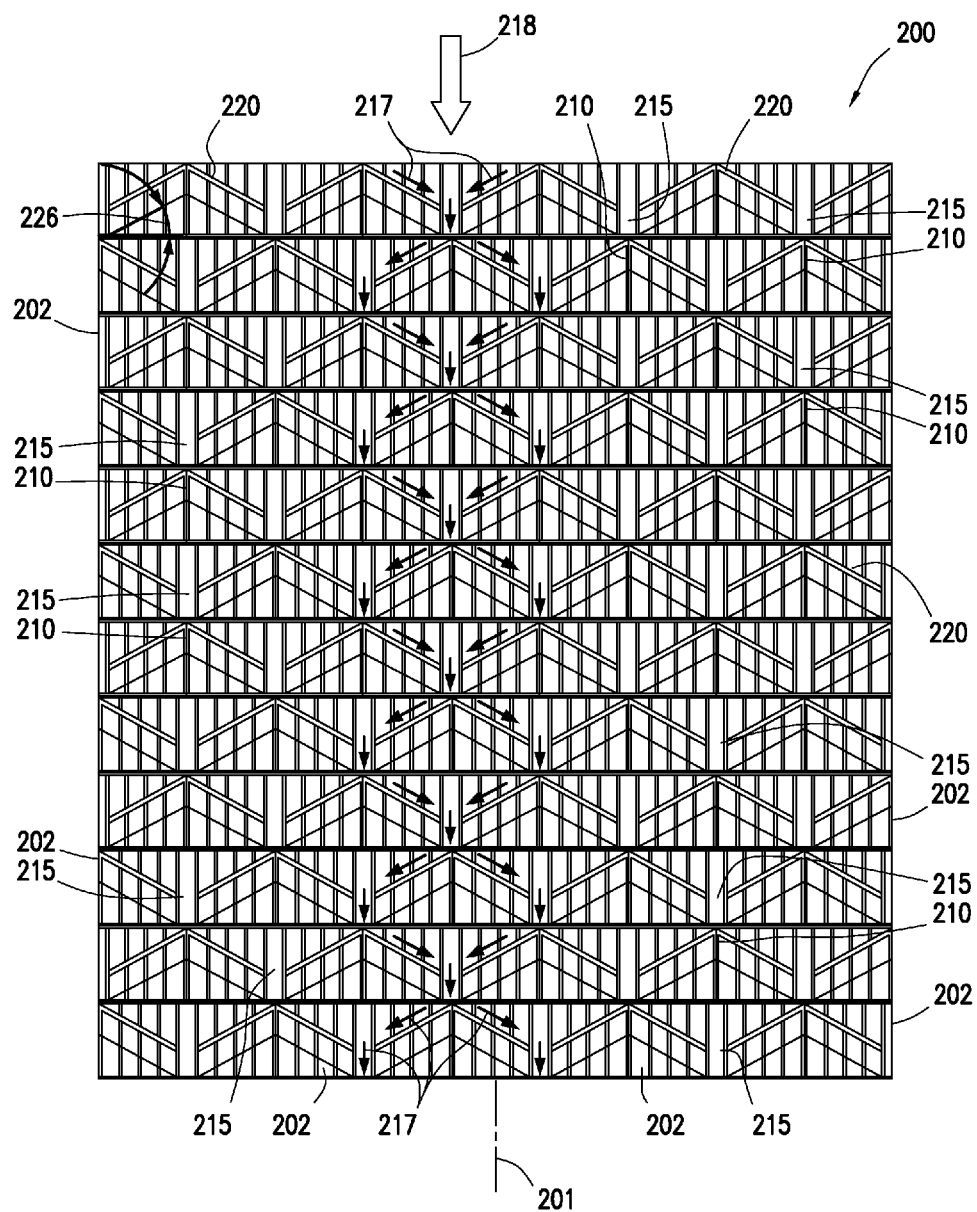
FIG. 2C is a plan view of the illustrative screen panel assembly of FIG. 2A.

As noted previously, each of the raised screen components 220 may be arranged in a staggered or offset pattern on screen panel assembly 200. As shown in FIG. 2C, which is a plan view of the screen panel assembly 200 shown in FIG. 2A, the centerline of each raised screen component 200, i.e., the wedge surface 210 of each respective frame 203 (see, FIG. 2B), may be aligned with the flow gap 215 between the frames 203 of an adjacent pair of raised screen components 220 that are immediately upstream thereof. In the illustrative embodiment of FIG. 2C, each flow gap 215 may be staggered in relation to adjacent flow gaps 215 such that the wedge surfaces 210 of each respective frame 203 act to disrupt the flow path of the material mixture over the screen panel assembly 200, and thereby form an indirect or serpentine flow path 217 that generally moves along the material flow direction 218. It should be understood that in light of the general operational characteristics of the typical vibratory separation equipment, e.g., shale shakers, the solid particles that are separated by the screen assembly 200 will typically tend to move along the serpentine flow path 217 as the screen panel assembly 200 is vibrated along the displacement vector 212 during operation.

Figure 2D:
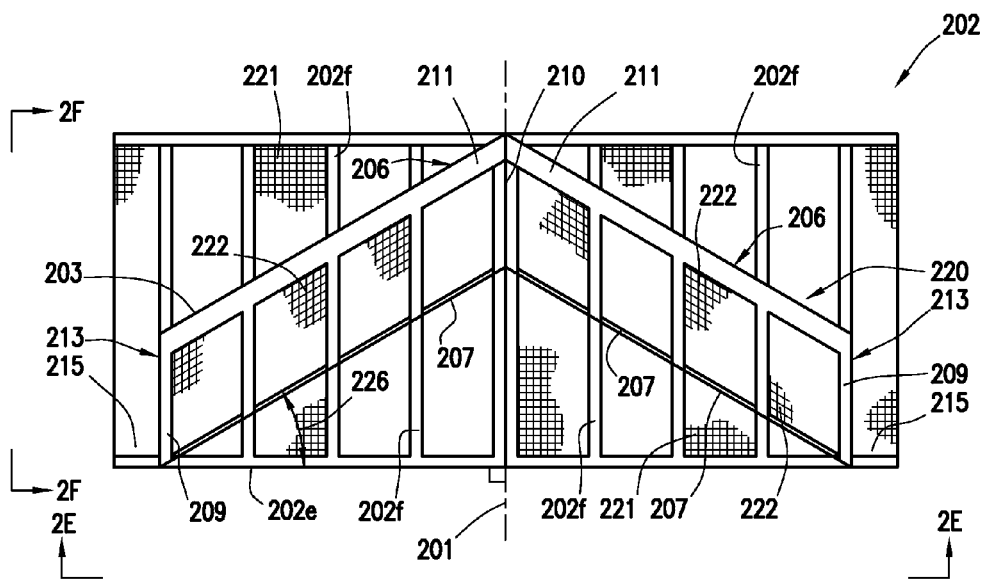
FIGS. 2D-2F are plan, front, and side elevation views, respectively, of the illustrative raised screen component depicted in FIG. 2B.
Figure 2E:
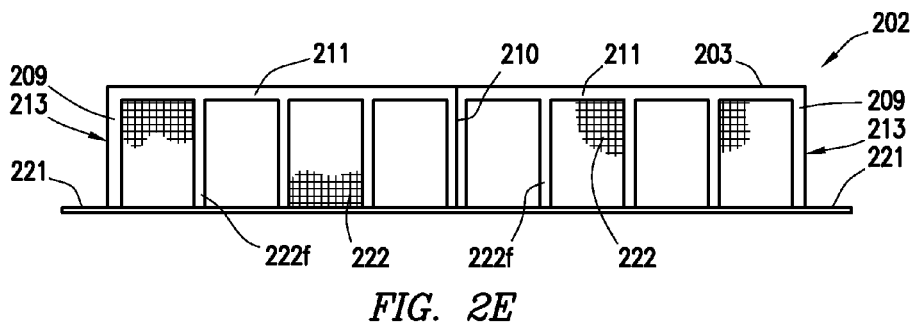
Figure 2F:
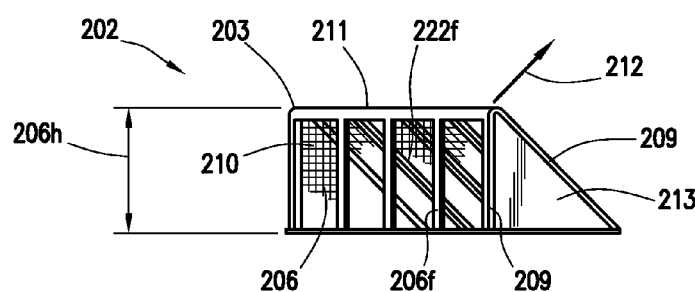

FIG. 2D is a close-up plan view of the illustrative screen panel 202 and raised screen component 220 shown in FIG. 2B and described above. Furthermore, FIG. 2E is a front elevation view of the screen panel 202 when viewed along the view line "2E-2E" of FIG. 2D, and FIG. 2F is a side elevation view of the screen panel 202 when viewed along the view line "2F-2F." As shown in FIG. 2D, the front edge 202e may be perpendicular to the longitudinal axis 201 (and, i.e., the displacement vector 212), and the inclined screen surfaces 222 may be oriented at an angle 226 to the front edge 202e (i.e., to a plane that is perpendicular to the displacement vector 212), and partial flow gaps 215 are positioned adjacent to each side panel 213. As shown in FIGS. 2D-2F, the wedge surface 210 may typically be positioned substantially on the centerline of the frame 203, i.e., between either side of the chevron-shaped raised screen component 220. As shown in FIG. 2F, the frame 203 may have a height 203h, and the side panels 213 may have a substantially triangular shape.

In certain exemplary embodiments, the frame 203 of each raised screen component 220 may be constructed as an integral component of an individual screen panel 202. In other embodiments, the frames 203 may be separately constructed and coupled to the screen panel assembly 200 via adhesives, brazing, welding, or other coupling methods. Furthermore, in at least some embodiments, the frames 203 for individual raised screen components 220 may be removably coupled to the screen panel 202, thus facilitating the removal of frames 203 from the screen panel assembly 200 for replacement or repair as needed independently of other raised screen components, i.e., without replacing the entire screen panel assembly 200.

In operation, the screen panel assembly 200 may be displaced, or vibrated, along the displacement vector 212 while a fluid mixture, e.g., a mixture of drilling fluid and drill cuttings, is fed across the screen panel assembly 200 in the material flow direction 218. As the material mixture moves along the screen panel assembly 200, at least some of the fluids that make up the material mixture may pass through the screen surfaces 221 of the screen panels 202, the vertical screen surfaces 206, and the inclined screen surfaces 222. Solid particles of the mixture that cannot pass through the screen surfaces 221, the vertical screen surfaces 206, or the inclined screen surfaces 222 may tend to come to rest on the surfaces 221 of the screen panels 202. The combination of material flow in general direction 218 and the vibrational acceleration or displacement of the screen panel assembly 200 along the displacement vector may thus cause the solid particles to continuously move across the screen panel assembly 200 along the serpentine flow path 217 (see, FIGS. 2B and 2C).

Figure 3A:
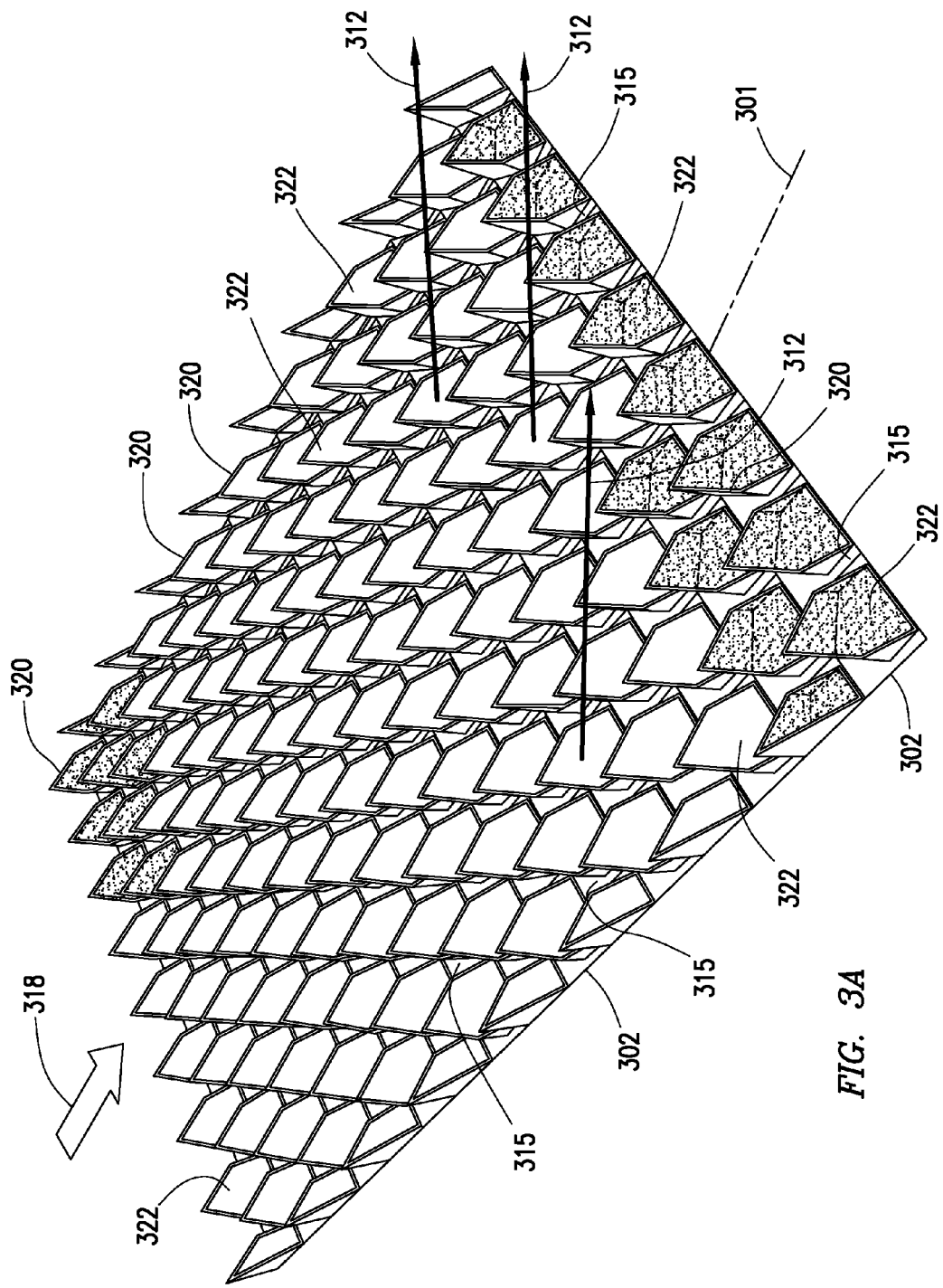
FIG. 3A is a is a perspective view of a screen panel assembly having a plurality of raised screen components in accordance with another illustrative embodiment of the present disclosure.
Figure 3B:
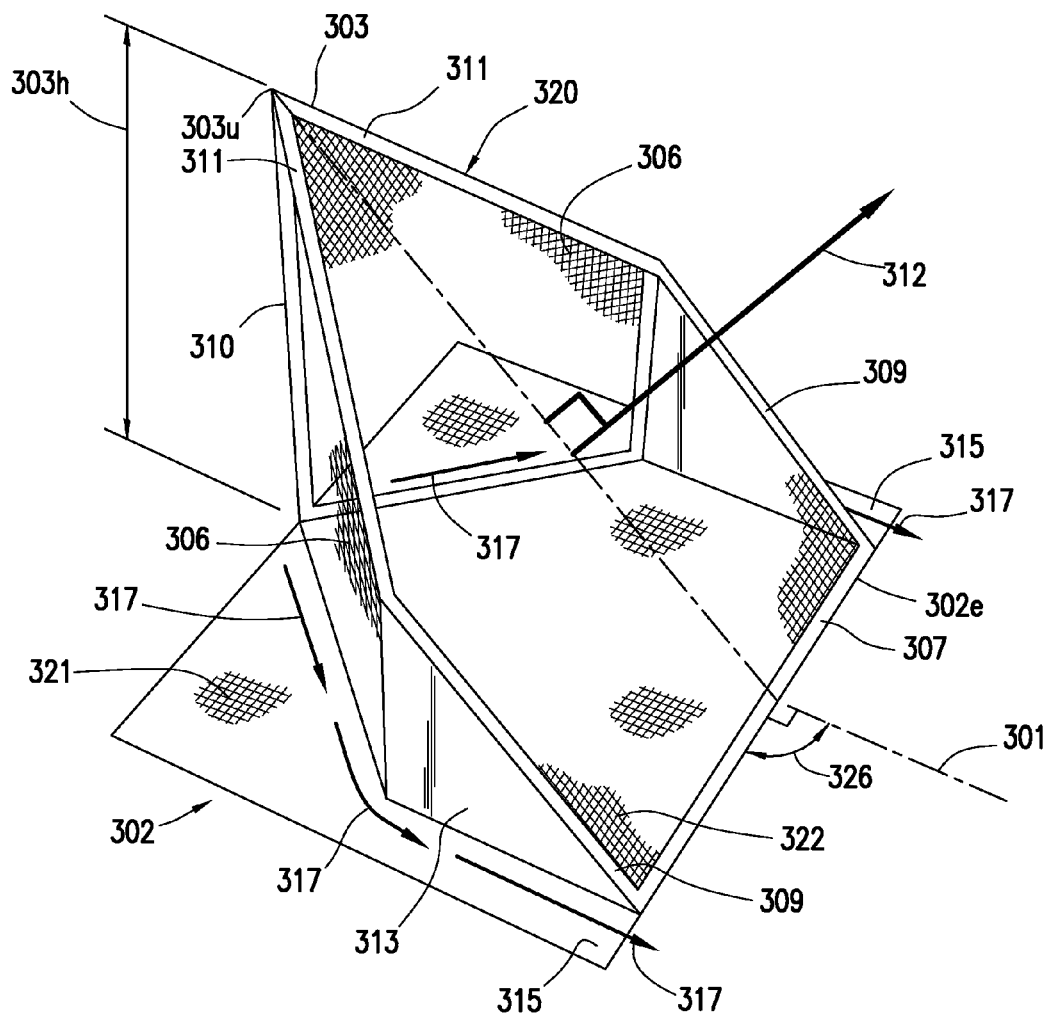
FIG. 3B is a close-up perspective view of a single raised screen component of the illustrative screen panel assembly depicted in FIG. 3A.

FIG. 3A is a perspective view of a further illustrative screen panel assembly 300 disclosed herein, and FIG. 3B is a close-up perspective view of one exemplary raised screen component 320 of the screen panel assembly 300 shown in FIG. 3A. Similar to the screen panel assembly 200 illustrated in FIGS. 2A-2F above, the screen panel assembly 300 may include a plurality of individual screen panels 302, each of which may include a raised screen component 320. See, e.g., FIG. 3B, described in further detail below. In other embodiments, each screen panel 302 may include a plurality of raised screen components 320, e.g., two or more, coupled thereto, whereas in still further embodiments, the screen panel assembly 300 may include a substantially continuous single screen panel 302. In those embodiments wherein the screen panel assembly 300 includes a single substantially continuous screen panel 302, each of the plurality of raised screen components 320 may be coupled to the screen panel assembly 300, e.g., to the screen panel 302.

As shown in FIG. 3A, the raised screen components 320 may each have an inclined front screen surface 322, which may be arranged substantially perpendicular to a vibrational acceleration displacement vector 312 that is based on the operational characteristics of the vibratory separation device, e.g., shale shaker (not shown), in which the screen panel assembly 300 may be installed. As shown in FIG. 3A, the plurality of raised screen components 320 may be arranged across the screen panel assembly 300 in a staggered or offset pattern, such that the centerline of a given raised screen component 320 in one row of raised screen components 320 may be substantially aligned with a flow gap 315 between immediately adjacent pairs of raised screen components 320 in an upstream and a downstream row of raised screen components 320. See, FIG. 3C.

In some embodiments, a material mixture, e.g., drilling fluid and drill cuttings, may generally flow across the screen panel assembly 300 in a nominal material flow direction 318 that is substantially parallel to the longitudinal axis 301 of the screen panel assembly 300. However, in view of the staggered or offset pattern arrangement of the raised screen components 320, the material mixture may have a locally indirect or serpentine flow path 317, that is, wherein the material flows around each of the raised screen components 320, through the flow gaps 315 between each raised screen component 320, and then to the next row of raised screen components 320. See, FIGS. 3B and 3C.

As noted previously, in at least some embodiments, the screen panel 302 may include a single raised screen panel component 320 (as is shown in the illustrative embodiment depicted in FIG. 3B), whereas in other embodiments the screen panel 302 may include a plurality of raised screen panel components 320. Whether the screen panel 302 includes a single raised screen panel component 320 (as depicted in FIG. 3B) or a plurality of raised screen panel components 320, when the screen panel includes a single raised screen panel assembly 320, each of the raised screen panel assemblies may include a front side inclined screen surface 322, side panels 313, a wedge surface, or plow, 310, and back side vertical screen surfaces 306. The raised screen panel assembly 320 may include a frame 303 that is adapted to support the inclined screen surface 322, the vertical screen surfaces 306, and the side panels 313.

As shown in FIG. 3B, the frame 303 may include a lower, or first, edge 307 running along the bottom edge of the inclined screen surface 322 that may be aligned with the top surface of the screen panel 302. Additionally, the frame 303 may also include side, or second, edges 309 that extend upward from the top surface of the screen panel 302 to a top, or third, edge 311. In some embodiments, the third edges 311 angle inward to a centerline of the frame 303 and upward to an upper point 303u at a height 303h above the screen panel 302, such that the inclined screen surface 322 forms a modified pentagon shape. As noted with respect to the raised screen components 220 in FIGS. 2A-2F above, the height 303h of the raised screen components 320 may be in the range of approximately 1 inch to 3 inches, although other heights may also be used depending on the design parameter of the vibratory separation device.

In some embodiments, the frame 304 may extend downward from the upper point 303u to the top surface of screen panel 302 to form the wedge surface 310. Furthermore, the screen panel 302 may include screening material 321 disposed on the top surface thereof. In some embodiments, one or both of the side panels 313 and/or the wedge surface 310 may be a screened surface, e.g., screening material, whereas in other embodiments, the side panels 313 and/or the wedge surface 310 may be solid surfaces, e.g., sheet metal and the like.

In some embodiments, the inclined screen surface 322 may be inclined with respect to the screen panel 302 at an angle that is perpendicular to the displacement vector 312. Furthermore, while FIG. 3B shows that the inclined screen surface 322 may be aligned with a plane that includes the front edge 302e of the of the screen panel 302, and that the front edge 302e may be oriented at an angle 326 that is perpendicular to the longitudinal axis 301, it should be appreciated that the front edge 302e of the screen panel 302—and the plane of the inclined screen surface 322—need not be perpendicular to the longitudinal axis 301. Instead, as with the illustrative screen panel 202 shown in FIGS. 2B-2F above, the inclined screen surface 322 may be aligned with a plane that is oriented at an angle relative to a plane that is perpendicular to the longitudinal axis 301 and the displacement vector 312, wherein in some embodiments the angle is less than approximately 45°.

Figure 3C:
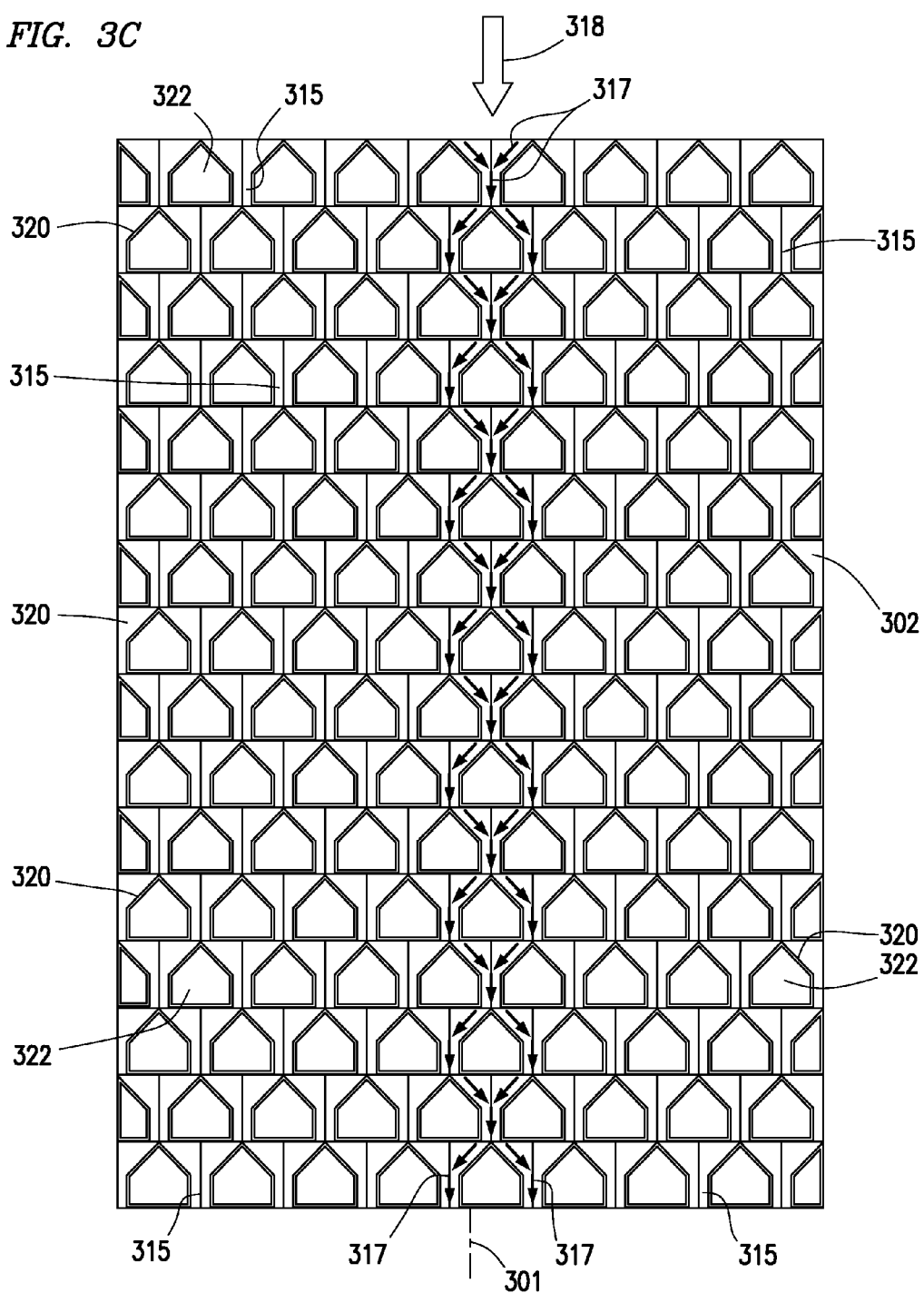
FIG. 3C is a plan view of the illustrative screen panel assembly of FIG. 3A.

As noted previously, each of the raised screen components 320 may be arranged in a staggered or offset pattern on screen panel assembly 300. As shown in FIG. 3C, which is a plan view of the screen panel assembly 300 shown in FIG. 3A, the centerline of each raised screen component 300, i.e., the wedge surface 310 of each respective frame 303 (see, FIG. 3B), may be aligned with the flow gap 315 between the frames 303 of an adjacent pair of raised screen components 320 that are immediately upstream thereof. In the illustrative embodiment of FIG. 3C, each flow gap 315 may be staggered in relation to adjacent flow gaps 315 such that the wedge surfaces 310 of each respective frame 303 act to disrupt the flow path of the material mixture over the screen panel assembly 300, and thereby form an indirect or serpentine flow path 317 that generally moves along the material flow direction 318. It should be understood that in light of the general operational characteristics of the typical vibratory separation equipment, e.g., shale shakers, the solid particles that are separated by the screen assembly 300 will typically tend to move along the serpentine flow path 317 as the screen panel assembly 300 is vibrated along the displacement vector 312 during operation.

Figure 3D:
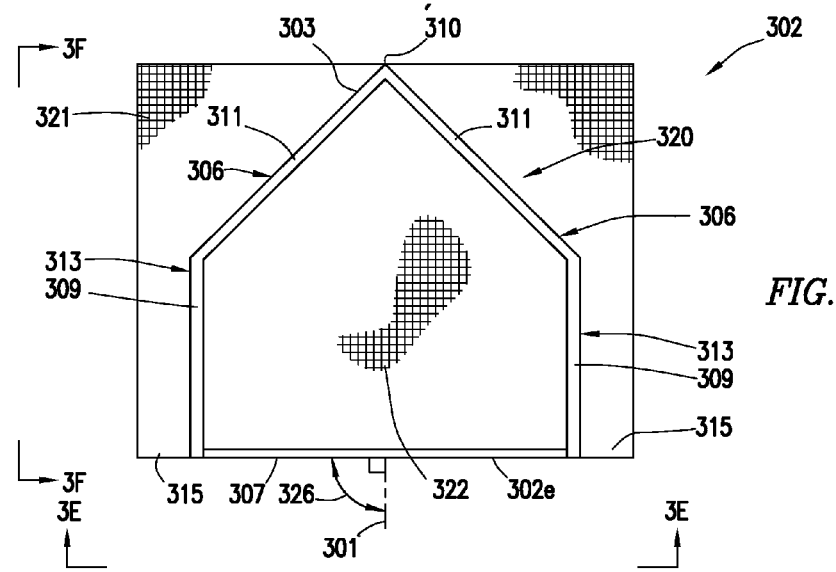
FIGS. 3D-3F are plan, front, and side elevation views, respectively, of the exemplary raised screen component depicted in FIG. 3B.
Figure 3F:
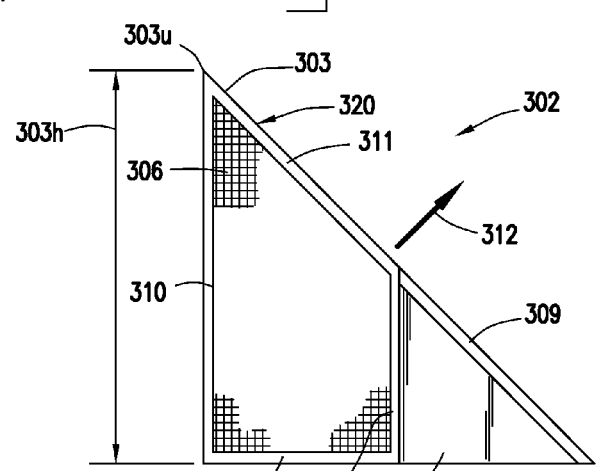
Figure 3E:
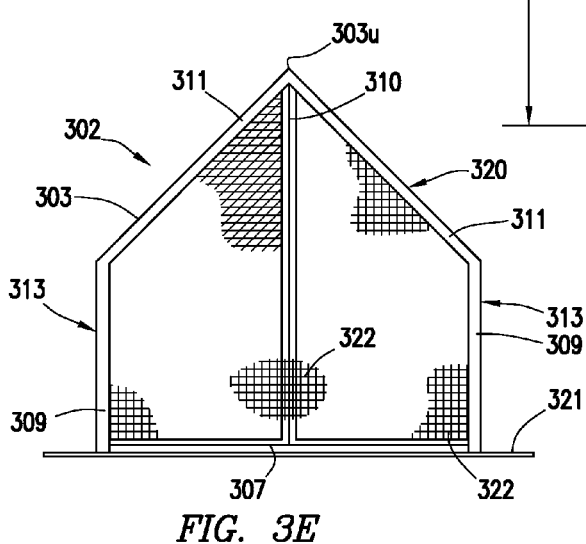

FIG. 3D is a close-up plan view of the illustrative screen panel 302 and raised screen component 320 shown in FIG. 3B and described above. Furthermore, FIG. 3E is a front elevation view of the screen panel 302 when viewed along the view line "3E-3E" of FIG. 3D, and FIG. 3F is a side elevation view of the screen panel 302 when viewed along the view line "3F-3F." As shown in FIG. 3D, the front edge 302e may be perpendicular to the longitudinal axis 301 (and, i.e., the displacement vector 312), in which case the inclined screen surface 322 will be aligned with a plane that is oriented at an angle 326 that is perpendicular to the displacement vector 312. However, as noted above, the front edge 302e of the screen panel 302—and the plane of the inclined screen surface 322—need not be perpendicular to the longitudinal axis 301. Therefore, in at least some embodiments, the inclined screen surface 322 may be aligned with a plane that is oriented at an angle relative to a plane that is perpendicular to the longitudinal axis 301 and the displacement vector 312, wherein in some embodiments the angle is less than approximately 45°.

Also as shown in FIG. 3D, partial flow gaps 315 are positioned adjacent to each side panel 313 of the raised screen component 320. Furthermore, as shown in FIGS. 3D-3F, the wedge surface 310 may typically be positioned substantially along the centerline of the frame 303, the frame 303 may have a height 303h, the side panels 313 may have a substantially triangular shape, and the back side screen surfaces 306 may have a substantially trapezoidal shape.

In certain exemplary embodiments, the frame 303 of each raised screen component 320 may be constructed as an integral component of an individual screen panel 302. In other embodiments, the frames 303 may be separately constructed and coupled to the screen panel assembly 300 via adhesives, brazing, welding, or other coupling methods. Furthermore, in at least some embodiments, the frames 303 for individual raised screen components 320 may be removably coupled to the screen panel 302, thus facilitating the removal of frames 303 from the screen panel assembly 300 for replacement or repair as needed independently of other raised screen components, i.e., without replacing the entire screen panel assembly 300.

In operation, the screen panel assembly 300 may be displaced, or vibrationally accelerated, along the displacement vector 312 while a fluid mixture, e.g., a mixture of drilling fluid and drill cuttings, is fed across the screen panel assembly 300 in the material flow direction 318. As the material mixture moves along the screen panel assembly 300, at least some of the fluids that make up the material mixture may pass through the screen surfaces 321 of the screen panels 302, the vertical screen surfaces 306, and the inclined screen surfaces 322. Solid particles of the mixture that cannot pass through the screen surfaces 321, the vertical screen surfaces 306, or the inclined screen surfaces 322 may tend to come to rest on the surfaces 321 of the screen panels 302. The combination of material flow in general direction 318 and the vibrational acceleration or displacement of the screen panel assembly 300 along the displacement vector may thus cause the solid particles to continuously move across the screen panel assembly 300 along the serpentine flow path 317 (see, FIGS. 3B and 3C).

Figure 4A:
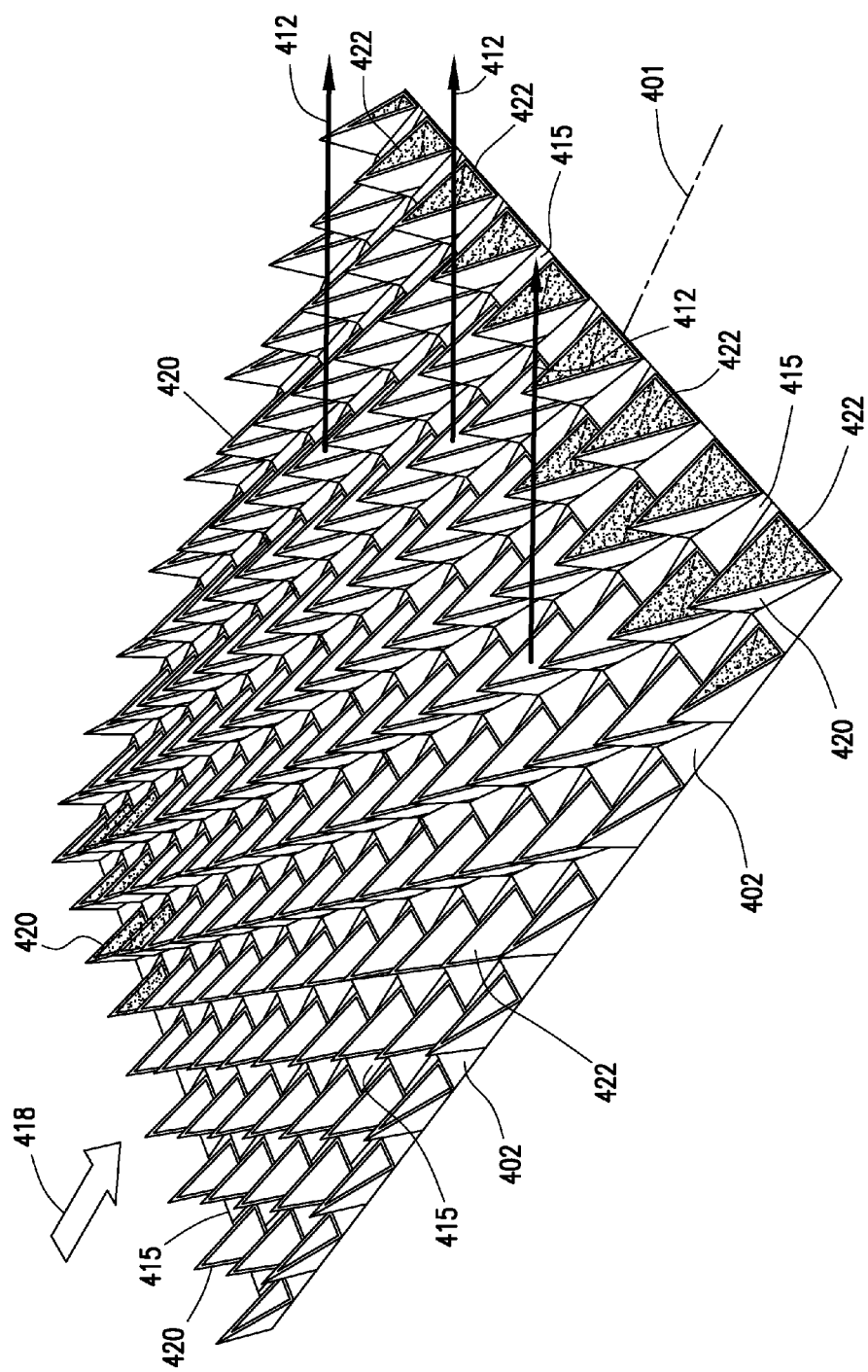
FIG. 4A is a is a perspective view of a screen panel assembly having a plurality of raised screen components in accordance with yet a further another exemplary embodiment of the present disclosure.
Figure 4B:
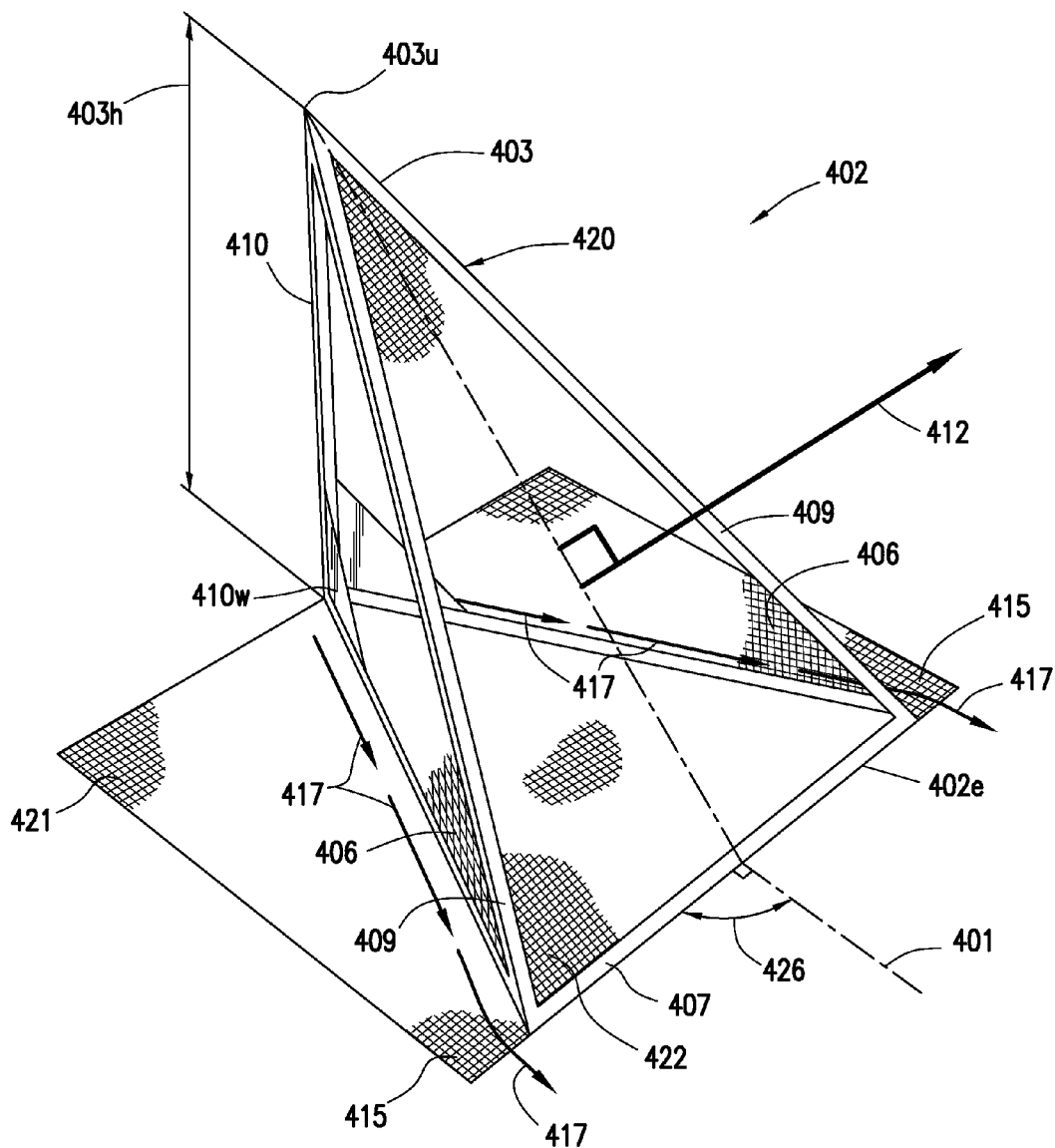
FIG. 4B is a close-up perspective view of a single raised screen component of the exemplary screen panel assembly depicted in FIG. 4A.

FIG. 4A is a perspective view of a further illustrative screen panel assembly 400 disclosed herein, and FIG. 4B is a close-up perspective view of one exemplary raised screen component 420 of the screen panel assembly 400 shown in FIG. 4A. Similar to the screen panel assembly 200 illustrated in FIGS. 2A-2F above, the screen panel assembly 400 may include a plurality of individual screen panels 402, each of which may include a raised screen component 420. See, e.g., FIG. 4B, described in further detail below. In other embodiments, each screen panel 402 may include a plurality of raised screen components 420, e.g., two or more, coupled thereto, whereas in still further embodiments, the screen panel assembly 400 may include a substantially continuous single screen panel 402. In those embodiments wherein the screen panel assembly 400 includes a single substantially continuous screen panel 402, each of the plurality of raised screen components 420 may be coupled to the screen panel assembly 400, e.g., to the screen panel 402.

As shown in FIG. 4A, the raised screen components 420 may each have an inclined front screen surface 422, which may be arranged substantially perpendicular to a vibrational acceleration displacement vector 412 that is based on the operational characteristics of the vibratory separation device, e.g., shale shaker (not shown), in which the screen panel assembly 400 may be installed. As shown in FIG. 4A, the plurality of raised screen components 420 may be arranged across the screen panel assembly 400 in a staggered or offset pattern, such that the centerline of a given raised screen component 420 in one row of raised screen components 420 may be substantially aligned with a flow gap 415 between immediately adjacent pairs of raised screen components 420 in an upstream and a downstream row of raised screen components 420. See, FIG. 4C.

In some embodiments, a material mixture, e.g., drilling fluid and drill cuttings, may generally flow across the screen panel assembly 400 in a nominal material flow direction 418 that is substantially parallel to the longitudinal axis 401 of the screen panel assembly 400. However, in view of the staggered or offset pattern arrangement of the raised screen components 420, the material mixture may have a locally indirect or serpentine flow path 417, that is, wherein the material flows around each of the raised screen components 420, through the flow gaps 415 between each raised screen component 420, and then to the next row of raised screen components 420. See, FIGS. 4B and 4C.

As noted previously, in at least some embodiments, the screen panel 402 may include a single raised screen panel component 420 (as is shown in the illustrative embodiment depicted in FIG. 4B), whereas in other embodiments the screen panel 402 may include a plurality of raised screen panel components 420. Whether the screen panel 402 includes a single raised screen panel component 420 (as depicted in FIG. 4B) or a plurality of raised screen panel components 420, each of the raised screen panel assemblies may include a front side inclined screen surface 422, side panels 406, and a wedge surface, or plow, 410. The raised screen panel assembly 420 may include a frame 403 that is adapted to support the inclined screen surface 422 and the side panels 406.

As shown in FIG. 4B, the frame 403 may include a lower, or first, edge 407 running along the bottom edge of the inclined screen surface 422 that may be aligned with the top surface of the screen panel 402. Additionally, the frame 403 may also include top, or second, edges 409 that angle inward to a centerline of the frame 403 and upward to an upper point 403u at a height 403h above the screen panel 402, such that the inclined screen surface 422 forms a triangular shape. As noted with respect to the raised screen components 220 in FIGS. 2A-2F above, the height 403h of the raised screen components 420 may be in the range of approximately 1 inch to 3 inches, although other heights may also be used depending on the design parameter of the vibratory separation device.

In some embodiments, the frame 404 may extend downward from the upper point 403u to the top surface of screen panel 402 to form the wedge surface 410. In some embodiments, the side panels 406 may be solid surfaces, e.g., sheet metal and the like. In other embodiments, one or both of the side panels 406 may be a screened surface, e.g., screening material, in which case the wedge surface 410 may also include an extended wear plate 410w so as to reduce wear as the material mixture flows around the wedge surface along the serpentine path 417. Furthermore, the screen panel 402 may include screening material 421 disposed on the top surface thereof.

In some embodiments, the inclined screen surface 422 may be inclined with respect to the screen panel 402 at an angle that is perpendicular to the displacement vector 412. Furthermore, while FIG. 4B shows that the inclined screen surface 422 may be aligned with a plane that includes the front edge 402e of the of the screen panel 402, and that the front edge 402e may be orientated at an angle 426 that is perpendicular to the longitudinal axis 401, it should be appreciated that the front edge 402e of the screen panel

402—and the plane of the inclined screen surface 422—need not be perpendicular to the longitudinal axis 401. Instead, as with the illustrative screen panel 202 shown in FIGS. 2B-2F above, the inclined screen surface 422 may be aligned with a plane that is oriented at an angle relative to a plane that is perpendicular to the longitudinal axis 401 and the displacement vector 412, wherein in some embodiments the angle is less than approximately 45°.

Figure 4C:
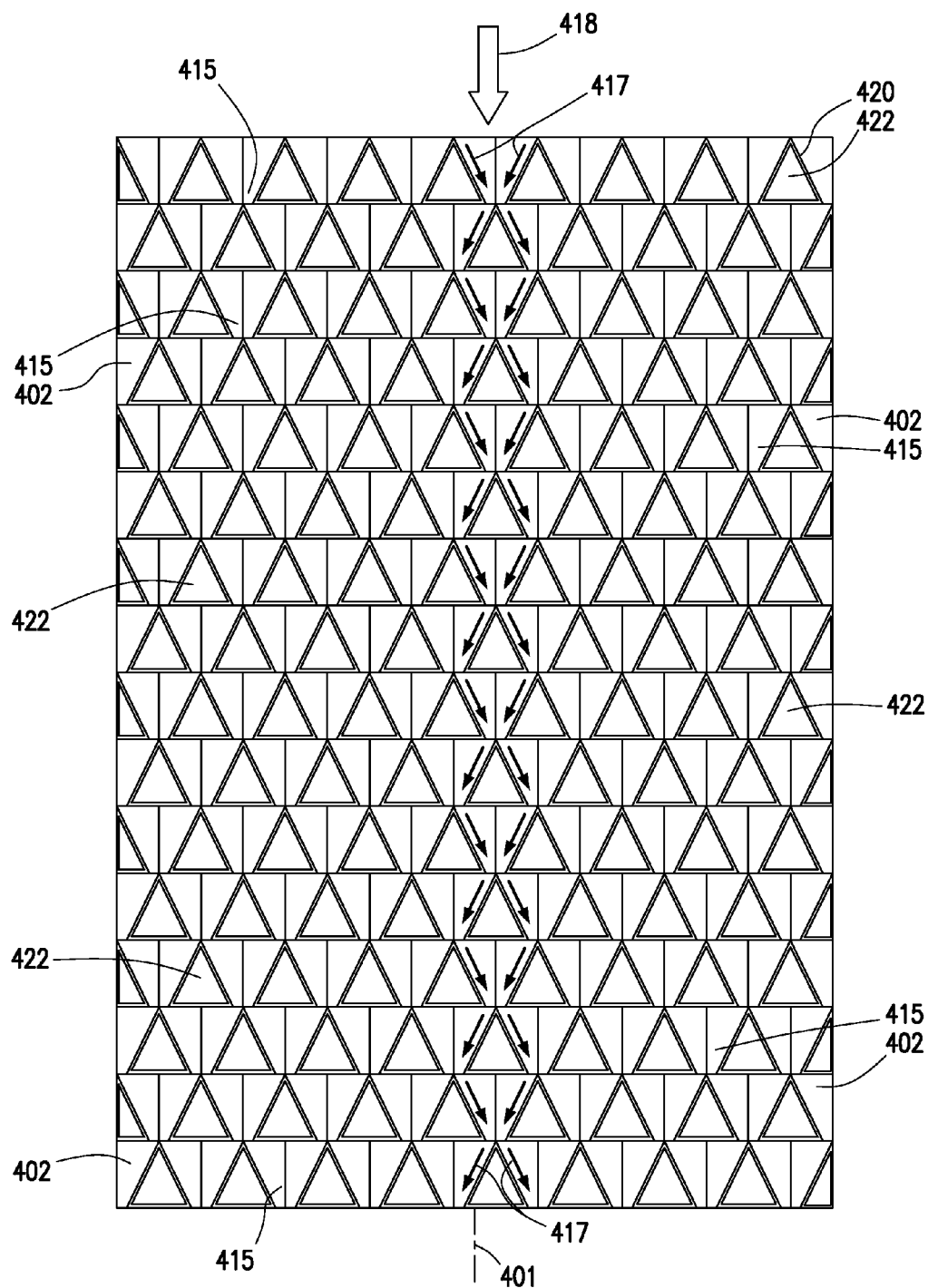
FIG. 4C is a plan view of the exemplary screen panel assembly of FIG. 4A.

As noted previously, each of the raised screen components 420 may be arranged in a staggered or offset pattern on screen panel assembly 400. As shown in FIG. 4C, which is a plan view of the screen panel assembly 400 shown in FIG. 4A, the centerline of each raised screen component 400, i.e., the wedge surface 410 and/or wear plate 410*w* of each respective frame 403 (see, FIG. 4B), may be aligned with the flow gap 415 between the frames 403 of an adjacent pair of raised screen components 420 that are immediately upstream thereof. In the illustrative embodiment of FIG. 4C, each flow gap 415 may be staggered in relation to adjacent flow gaps 415 such that the wedge surfaces 410 and/or wear plates 410*w* of each respective frame 403 act to disrupt the flow path of the material mixture over the screen panel assembly 400, and thereby form an indirect or serpentine flow path 417 that generally moves along the material flow direction 418. It should be understood that in light of the general operational characteristics of the typical vibratory separation equipment, e.g., shale shakers, the solid particles that are separated by the screen assembly 400 will typically tend to move along the serpentine flow path 417 as the screen panel assembly 400 is vibrated along the displacement vector 412 during operation.

FIG. 4D is a close-up plan view of the illustrative screen panel 402 and raised screen component 420 shown in FIG. 4B and described above. Furthermore, FIG. 4E is a front elevation view of the screen panel 402 when viewed along the view line "4E-4E" of FIG. 4D, and FIG. 4F is a side elevation view of the screen panel 402 when viewed along the view line "4F-4F." As shown in FIG. 4D, the front edge 402*e* may be perpendicular to the longitudinal axis 401 (and, i.e., the displacement vector 412), in which case the inclined screen surface 422 will be aligned with a plane that is oriented at an angle 426 that is perpendicular to the displacement vector 412. However, as noted above, the front edge 402*e* of the screen panel 402—and the plane of the inclined screen surface 422—need not be perpendicular to the longitudinal axis 401. Therefore, in at least some embodiments, the inclined screen surface 422 may be aligned with a plane that is oriented at an angle relative to a plane that is perpendicular to the longitudinal axis 401 and the displacement vector 412, wherein in some embodiments the angle is less than approximately 45°.

Also as shown in FIG. 4D, partial flow gaps 415 are positioned adjacent to each side panel 406 of the raised screen component 420. Furthermore, as shown in FIGS. 4D-4F, the wedge surface 410 and/or wear plate 410*w* may typically be positioned substantially along the centerline of the frame 403, the frame 403 may have a height 403*h*, and the side panels 406 may have a substantially triangular shape.

In certain exemplary embodiments, the frame 403 of each raised screen component 420 may be constructed as an integral component of an individual screen panel 402. In other embodiments, the frames 403 may be separately constructed and coupled to the screen panel assembly 400 via adhesives, brazing, welding, or other coupling methods. Furthermore, in at least some embodiments, the frames 403 for individual raised screen components 420 may be removably coupled to the screen panel 402, thus facilitating the removal of frames 403 from the screen panel assembly 400 for replacement or repair as needed independently of other raised screen components, i.e., without replacing the entire screen panel assembly 400.

In operation, the screen panel assembly 400 may be displaced, or vibrationally accelerated, along the displacement vector 412 while a fluid mixture, e.g., a mixture of drilling fluid and drill cuttings, is fed across the screen panel assembly 400 in the material flow direction 418. As the material mixture moves along the screen panel assembly 400, at least some of the fluids that make up the material mixture may pass through the screen surfaces 421 of the screen panels 402, the vertical screen surfaces 406, and the inclined screen surfaces 422. Solid particles of the mixture that cannot pass through the screen surfaces 421, the vertical screen surfaces 406, or the inclined screen surfaces 422 may tend to come to rest on the surfaces 421 of the screen panels 402. The combination of material flow in general direction 418 and the vibrational displacement of the screen panel assembly 400 along the displacement vector may thus cause the solid particles to continuously move across the screen panel assembly 400 along the serpentine flow path 417 (see, FIGS. 4B and 4C).

Figure 5A:
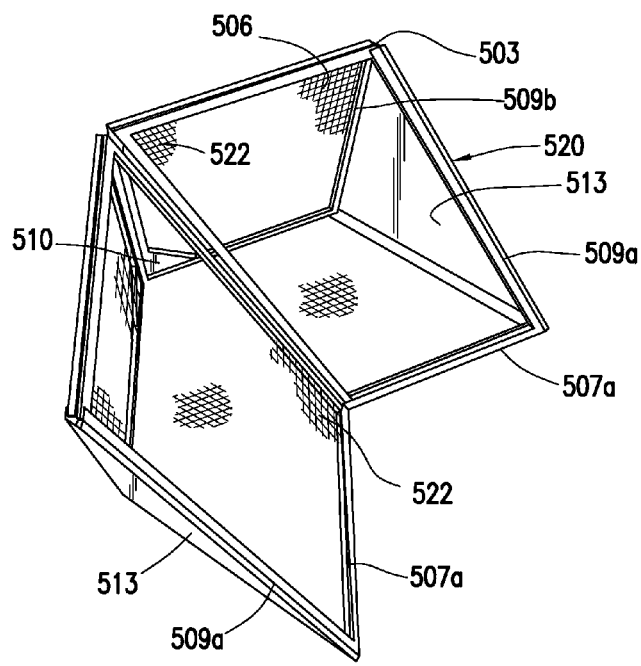
FIGS. 5A-5D are various perspective views of one illustrative embodiment of a modular construction configuration of a raised screen component in accordance with the subject matter disclosed herein.

FIGS. 5A-5D are various perspective views of an exemplary modular construction configuration of a raised screen component 520 in accordance of one illustrative embodiment of the present disclosure. As shown in FIG. 5A, the exemplary raised screen component 520 includes a plurality of front side inclined screen sub-panels 522, side panels 513, and a plurality of back side vertical screen sub-panels 506, which may be oriented and configured in accordance with any of the raised screen component embodiments disclosed herein. For example, the raised screen panel assembly 520 may include a frame 503 that is adapted to support the inclined screen sub-panels 522, the vertical screen sub-panels 506, and the side panels 513. Furthermore, as shown in FIGS. 5A-5D, the frame 503 may include front and back lower support members 507*a* and 507*b* that may be positioned on, i.e., aligned with, the top surface of a screen panel (not shown; see, e.g., screen panel 202 shown in FIG. 2B). Additionally, the frame 503 may also include front and back support members 509*a* and 509*b* that may extend upward from the top surface of the screen panel. Additionally, the support members 507*a/b* and 509*a/b* may be attached to the side panels 513.

Figure 5B:
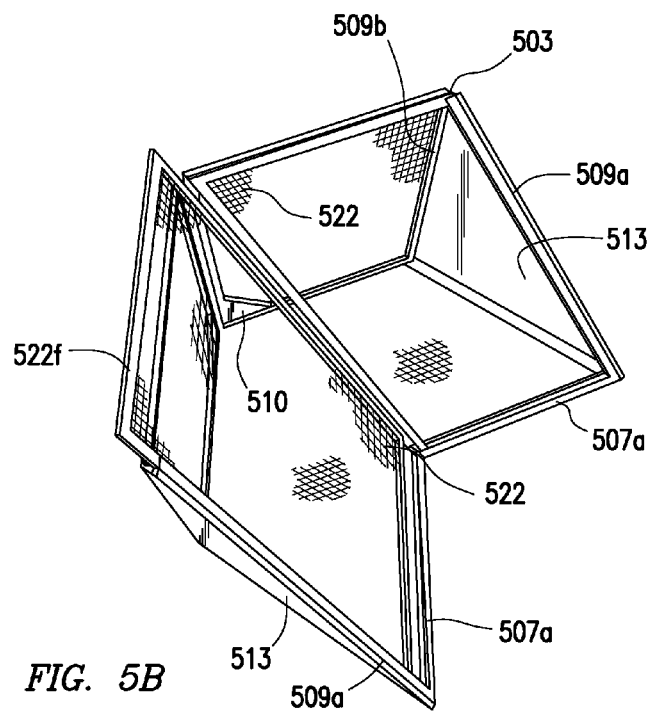
Figure 5C:
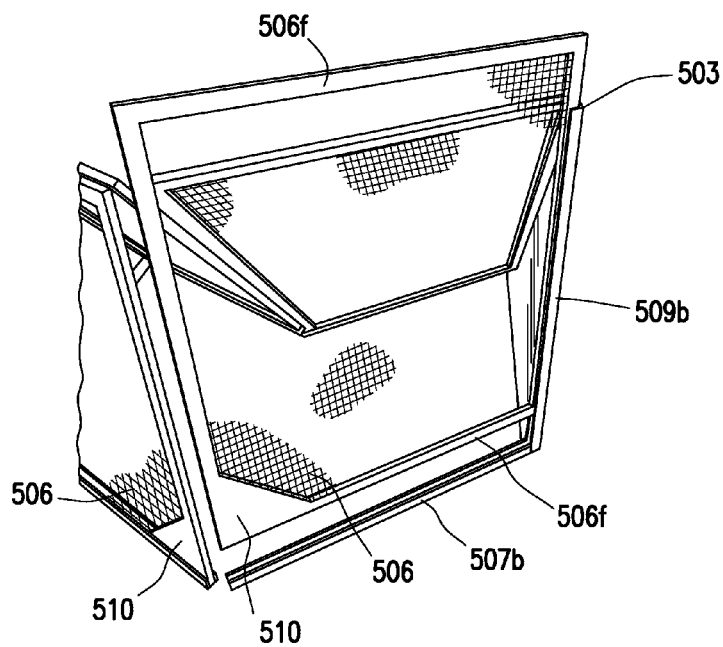
Figure 5D:
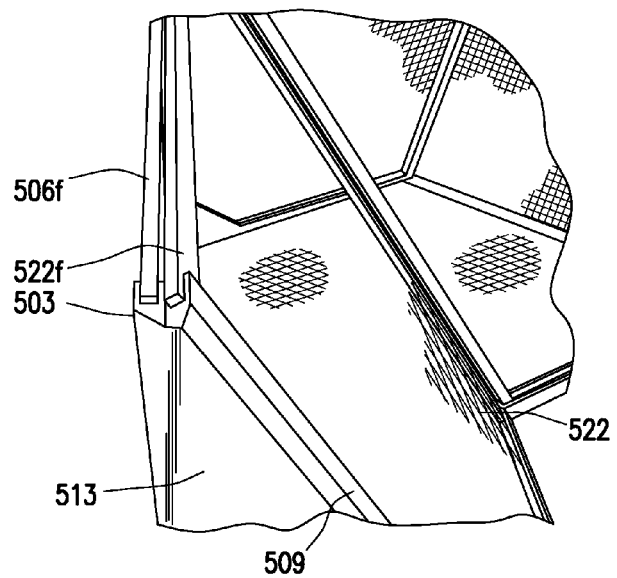

In certain embodiments, and as shown in FIGS. 5B-5D, the front and back support members 507*a/b* and 509*a/b* may have a channel-shaped configuration and the like, which may be adapted to receive a respective screen sub-panel frame 522*f* or 506*f*. For example, the front side inclined screen sub-panels 522 may include a screen sub-panel frame 522*f*, whereas the back side vertical screen sub-panels 506 may include a screen sub-panel frame 506*f*. In some embodiments, the front lower and front side channel-shaped support members 507*a* and 509*a*, respectively, may be adapted to receive the screen sub-panel frames 522*f*, i.e., the inclined screen sub-panels 522. Furthermore, the back lower and back side channel-chapped support members 507*b* and 509*b*, respectively, may be adapted to receive the screen sub-panel frames 506*f*, i.e., the vertical screen sub-panels 506. Moreover, in at least one exemplary embodiment, the front and back channel-shaped support members 507*a/b* and 509*a/b* may be adapted to slidably receive the screen sub-panel frames 522*f* (as shown in FIG. 5B) and/or the screen sub-panel frames 506*f* (as shown in FIG. 5C).

Once installed screen sub-panel frames 522f and/or 506f may be affixed to the frame 503, that is, to the front and back support members 507a/b and 509a/b, and to the adjacent screen sub-panel frames 522f and/or 506f, via adhesives, brazing, welding, mechanical fasteners, or any other attachment methods known in the art. In certain illustrative embodiments, the frame 503 made up of the channel-shaped support members 507a/b and 509a/b illustrated in FIGS. 5A-5D and described above may allow for individual screen sub-panels 522 and/or 506 to be replaced without replacing the entire raised screen component 520. Furthermore, as shown in FIG. 5C, the back side vertical screen sub-panels 506 may include portions of a wedge surface, or plow 510, that may be constructed from a solid material so as to avoid undue wear of the screen sub-panels 506 during operation. In certain embodiments, individual screen sub-panels 522 and/or 506 may be replaced without removing the raised screen portion 520 from a larger screen panel assembly, such as the screen panel assemblies 200, 300, and/or 400 described above.

Figure 6A:
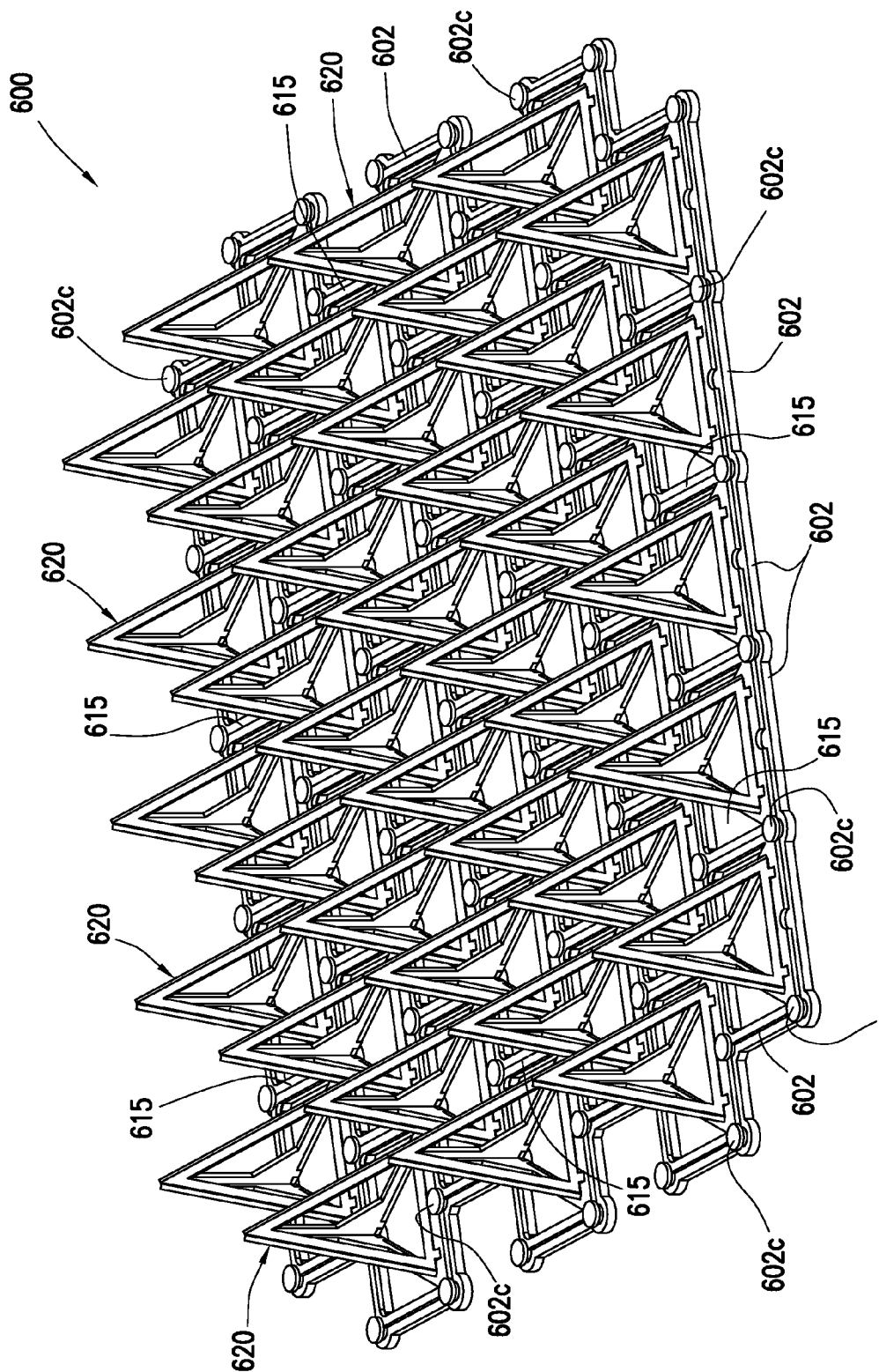
FIG. 6A is a perspective view of a partial screen panel assembly showing yet another modular construction configuration of a plurality of raised screen components in accordance with a further exemplary embodiment of the present disclosure.
Figure 6B:
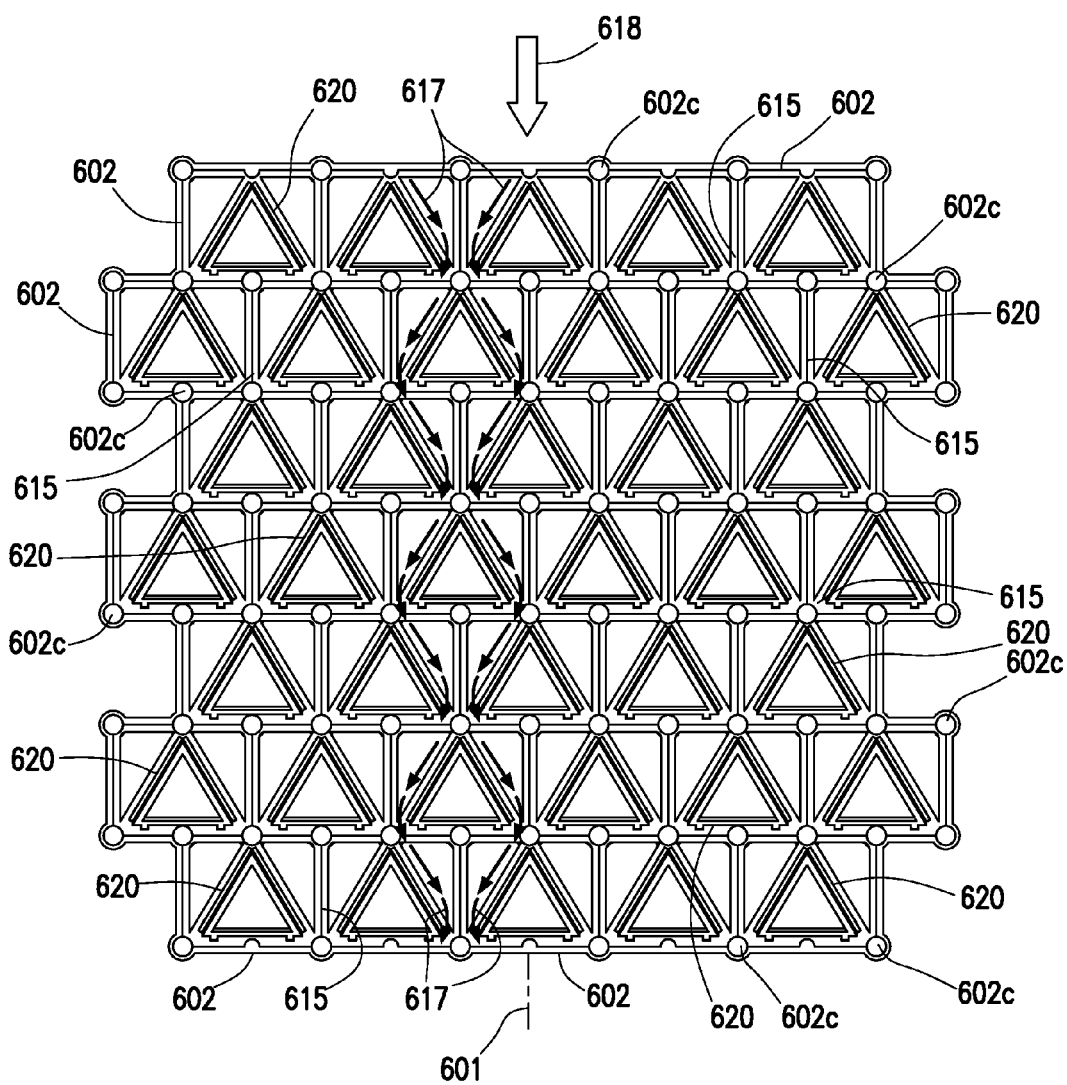
FIG. 6B is a plan view of the exemplary partial screen panel assembly depicted in FIG. 6A.
Figure 6C:
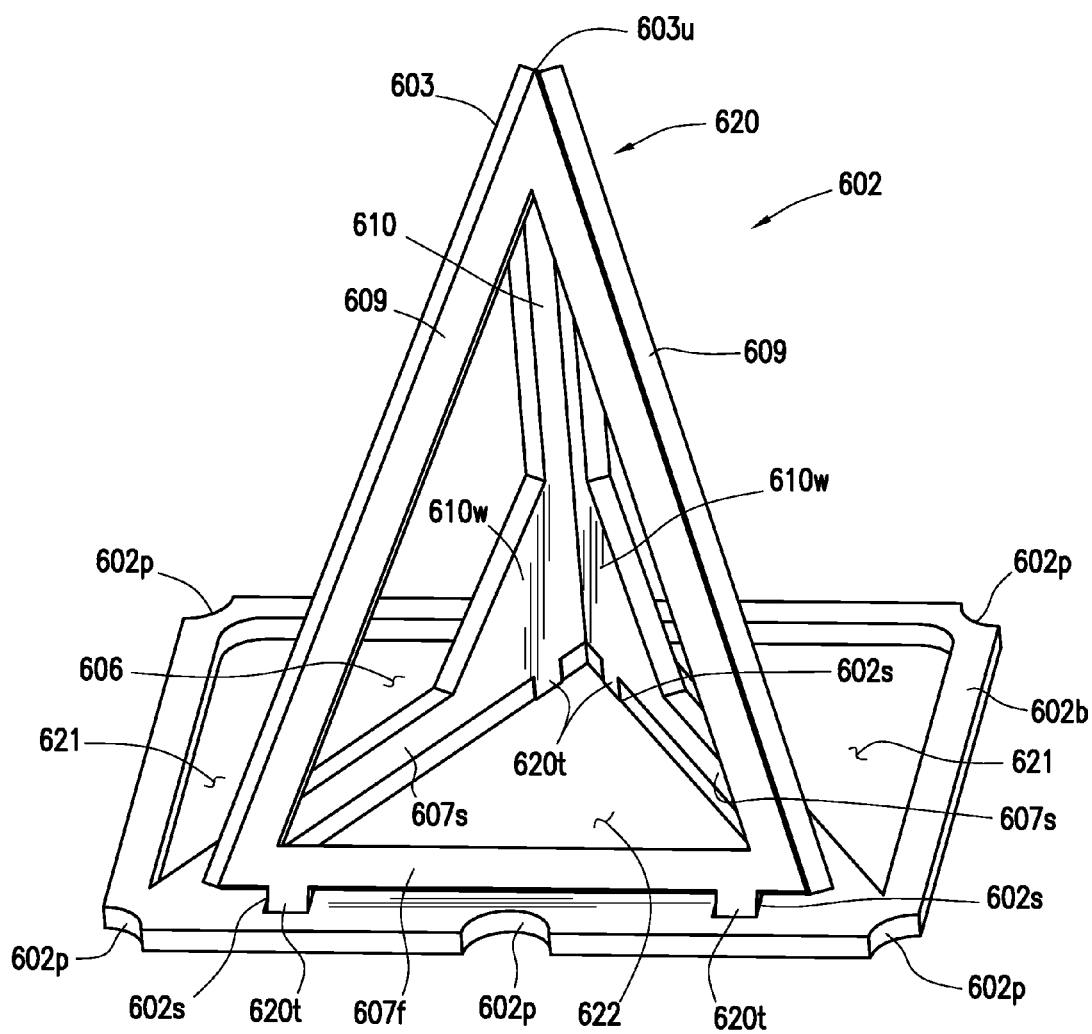
FIG. 6C is a close-up perspective view of a single raised screen component of the exemplary screen panel assembly depicted in FIG. 6A.

FIGS. 6A-6C are various views of a modular construction configuration of a screen panel assembly 600 that includes a plurality of raised screen components 620 in accordance with another illustrative embodiment of the present disclosure. More specifically, FIG. 6A is a perspective view of a partial screen panel assembly 600 that includes a plurality of raised screen components 620 may be modularly assembled into completed screen panel assembly 600, FIG. 6B is a plan view of the screen panel assembly shown in FIG. 6A, and FIG. 6C, is a close-up perspective view of a single raised screen component 620 shown in FIG. 6A.

As shown in FIGS. 6A and 6B, the screen panel assembly 600 may include a plurality of substantially identical screen sub-panels 602, each of which may be connected to the adjacent screen sub-panels 602 by a plurality of connectors 602c. In some embodiments, each of the screen sub-panels 602 may have a substantially rectangular shape and may include a raised screen component 620 removably attached thereto, as will be further discussed with respect to FIG. 6C below. Furthermore, as with the screen panel assemblies 200, 300, and 400 described herein and illustrated in FIGS. 2A-4F, the screen sub-panels 602 may be arranged in a staggered or offset patter, such that a flow gap 615 between immediately adjacent pair of raised screen components 620 may be substantially aligned with a centerline of raised screen component 620 in an adjacent row downstream thereof. In this way, the flow of a mixture of materials along a nominal material flow path 618 may be allowed to flow around the sides of each raised screen component 620 and through a corresponding flow gap 615, thus flowing across the screen panel 600 in a substantially serpentine-like flow path 617, as is described in further detail above.

It should be understood that the configuration of the partial screen panel assembly 600 depicted in FIGS. 6A and 6B is intended to be exemplary only, and is not limiting to the scope of the presently disclosed subject matter. For example, as shown in FIGS. 6A and 6B and noted above, each of the plurality of screen sub-panels 602 that make up the partial screen panel assembly 600 include a respective raised screen component 620 attached thereto. However, such a panel configuration is illustrative only, because at least some of the screen sub-panels 620 may not include a respective raised screen component 620. Furthermore, those screen sub-panels 620 without such raised screen components 620 may be randomly distributed over the screen panel assembly 600, or they may be distributed across the screen panel assembly in a recognizable and/or repeating pattern or sub-pattern.

Referring now to FIG. 6C, each screen sub-panel 602 may include a sub-panel base 602b that may have a plurality of partial circular openings 602p disposed around the perimeter thereof, such as at each corner and along at least some sides of the sub-panel base 602b. In certain embodiments, the partial circular openings 602p match up with, i.e., mate with, similarly shaped and positioned partial circular openings 602p in adjacent screen sub-panels 602, thereby forming a complete circular opening that may be adapted to receive a corresponding connector 602c, thus facilitating the inter-attachment of adjacent screen sub-panels 602.

In some embodiments, the raised screen component 620 depicted in FIG. 6C may include a frame 603 having a plurality of frame members. For example, the frame 603 may include a lower front frame member 607f, upper front frame members 609, lower side frame members 607s, and a back frame member 610, which may also be referred to as a wedge frame member 610. In at least some embodiments, an additional wedge wear plate 610w may be attached to and positioned between each lower side frame members 607s and the back frame member 610, thus providing additional wear resistance during operation of the screen panel assembly 600.

As shown in FIG. 6C, the lower frame members 607f and 607s may be aligned with the plane of the screen sub-panel base 602b, thus forming a triangular base of the raised screen component 620 that runs substantially horizontally across the upper surface of the base 602b. In certain embodiments, the upper frame members 609 may extend upward from the corners of the triangular base of the raised screen component 620 that are defined by the intersections of the lower front and side frame members 607f and 607s. Additionally, the back frame member 610 may extend upward from the corner of the triangular base of the raised screen component 620 that is defined by the intersection of the lower side frame members 607s. Furthermore, the upper front frame members 609 and the back frame member 610 may extend upward as noted above so as to meet at a common upper point or apex 603u, thus substantially forming a raised screen component 620 having the shape of a modified triangular prism.

For drawing clarity, screening material has not been illustrated in FIGS. 6A-6C. However, screening material may be disposed on the upper surface of the screen sub-panel base 602b, as indicated in FIG. 6C by element numbers 621. Additionally, screening material may also be disposed on the front plane of the raised screen component 620 that is defined by the lower front frame member 607f and the upper front frame members 609, thus defining an inclined screen surface 622, such as the inclined screen surfaces 222, 322, 422, or 522 described above. Furthermore, screening material may be disposed on the two side planes of the raised screen component 620 that are defined by a lower side frame member 607s, an upper front frame member 609, and the back frame member 610, thus defining side or back screen surfaces 609. Moreover, in some embodiments, screening material may also be disposed over the triangular opening at the bottom of the raised screen component 620 that is defined by each of the three lower frame members 607f and 607s, identified by element number 622, although in other exemplary embodiments, the opening 622 may not have screening material disposed thereon.

As shown in FIG. 6C, a plurality of tabs 620t may extend from the lower frame members 607f and 607s. In some embodiments, the base 602b of the screen sub-panel 602 may have a plurality of corresponding slots 602s, each of which may be adapted to receive a corresponding tab 620t. In at least one embodiment, one or more of the tabs 620t and a corresponding one or more slots 602s may be further adapted to have an interference fit, such that the frame 603 of the raised screen component 620 snaps into place on the base 602b of the screen sub-panel 602. Moreover, such a configuration facilitates relatively easy removal and replacement of damaged and/or malfunctioning (e.g., clogged) raised screen panel components 620.

Although the embodiments described above each illustrate screen assemblies having an array of identical frame assemblies, it should understood by those of ordinary skill after a complete reading of the present disclosure that in certain embodiments, a variety of different raised screen components may be utilized on a single screen panel assembly. Additionally, the illustrative raised screen components disclosed herein may only be present on a portion of a particular screen panel assembly while other portions of the screen panel assembly may be substantially planar or have other screen arrangements.

The particular embodiments disclosed above are illustrative only, as the invention may be modified and practiced in different but equivalent manners apparent to those skilled in the art having the benefit of the teachings herein. For example, the method steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A screen panel assembly, comprising:
a screen panel; and
one or more raised screen components disposed on said screen panel, each of said one or more raised screen components comprising:
an inclined screen surface that defines a first plane that is oriented at a first angle relative to said screen panel, said inclined screen surface having a front edge that is aligned with a top surface of said screen panel and is substantially perpendicular to a longitudinal axis of said screen panel, wherein said first plane is substantially perpendicular to a displacement vector along which said screen panel assembly is accelerated by a vibratory separation device; and
a wedge surface that is positioned at a back side of said raised screen component, wherein said wedge surface is adapted to disrupt a flow path of a flow of a material mixture flowing in a longitudinal direction across said screen panel by redirecting said flow around opposing sides of said raised screen component, wherein said wedge surface extends vertically from and is substantially perpendicular to said top surface of said screen panel.

2. The screen panel assembly of claim 1, wherein said inclined screen surface further comprises a plurality of second edges that extends upward from said top surface of said screen panel.

3. The screen panel assembly of claim 1, wherein said screen panel comprises a plurality of said one or more raised screen components.

4. The screen panel assembly of claim 1, wherein said wedge surface is positioned on an upstream side of said raised screen component and said front edge of said inclined screen surface is positioned on a downstream side of said raised screen component opposite of said wedge surface.

5. The screen panel assembly of claim 1, wherein said wedge surface extends vertically from said top surface of said screen panel to an upper point of said inclined screen surface.

6. The screen panel assembly of claim 1, further comprising a plurality of side panels supporting said inclined screen surface.

7. The screen panel assembly of claim 6, wherein each of said plurality of side panels comprises a screen surface.

8. The screen panel assembly of claim 6, wherein said wedge surface is positioned along a back edge of two of said plurality of side panels.

9. A screen panel assembly comprising
a plurality of screen panels; and
a plurality of raised screen components disposed on each of said plurality of screen panels, each of said plurality of raised screen components comprising:
an inclined screen surface having a front edge that is aligned with a top surface of a respective one of said plurality of screen panels and a plurality of second edges that extends upward from said top surface of said respective screen panel, said front edge being substantially perpendicular to a longitudinal axis of said respective screen panel, wherein said inclined screen surface defines a first plane that is oriented at a first angle relative to said respective screen panel and is substantially perpendicular to a displacement vector along which said screen panel assembly is accelerated by a vibratory separation device; and
a wedge surface that is positioned at a back side of said raised screen component, wherein said wedge surface is adapted to disrupt a flow path of a flow of a material mixture flowing in a longitudinal direction across said respective screen panel by redirecting said flow around opposing sides of said raised screen component, wherein said wedge surface extends vertically from and is substantially perpendicular to said top surface of said screen panel.

10. The screen panel assembly of claim 9, wherein each of said plurality of screen panels comprises at least two of said plurality of raised screen components.

11. The screen panel assembly of claim 9, further comprising a plurality of flow gaps, wherein each of said plurality of flow gaps is disposed between adjacent pairs of said plurality of raised screen components.

12. The screen panel assembly of claim 11, wherein said plurality of flow gaps forms a substantially serpentine flow path along said screen panel assembly.

13. The screen panel assembly of claim 12, wherein a centerline of at least one of said plurality of raised screen components is substantially aligned with a respective one of said plurality of flow gaps between an adjacent pair of said plurality of raised screen components that are positioned upstream of said at least one of said plurality of raised screen components relative to a flow direction of said substantially serpentine flow path.

14. The screen panel assembly of claim 9, wherein each of said plurality of raised screen components comprises a frame that is coupled to a respective one of said plurality of screen panels.

15. The screen panel assembly of claim 14, wherein each of said frames supports one of said inclined screen surfaces.

16. The screen panel assembly of claim 14, wherein said frame comprises said wedge surface.

17. The screen panel assembly of claim 9, wherein said screen panel assembly is a modular screen panel assembly, each of said plurality of screen panels is a modular screen sub-panel, and each of said plurality of raised screen components is a modular raised screen component, wherein each one of said plurality of modular screen sub-panels comprises a base that is adapted to be interchangeably coupled to one or more other ones of said plurality of modular screen sub-panels, and wherein each of said plurality of modular raised screen components is adapted to be interchangeably coupled to said base of each of said plurality of modular screen sub-panels.

18. The modular screen panel assembly of claim 17, wherein each of said plurality of modular raised screen components comprises a frame that is adapted to be removably coupled to a base of a respective one of said plurality of modular screen sub-panels.

19. The screen panel assembly of claim 9, wherein said wedge surface is positioned on an upstream side of said raised screen component and said front edge of said inclined screen surface is positioned on a downstream side of said raised screen component opposite of said wedge surface.

20. The screen panel assembly of claim 9, wherein said wedge surface extends vertically from said top surface of said screen panel to an upper point of said inclined screen surface.

21. The screen panel assembly of claim 9, further comprising a plurality of side panels supporting said inclined screen surface.

22. The screen panel assembly of claim 21, wherein each of said plurality of side panels comprises a screen surface.

23. The screen panel assembly of claim 21, wherein said wedge surface is positioned along a back edge of two of said plurality of side panels.

\* \* \* \* \*